US012293736B2

(12) United States Patent
Zhou et al.

(10) Patent No.: US 12,293,736 B2
(45) Date of Patent: May 6, 2025

(54) DRIVING METHOD OF DISPLAY PANEL AND DISPLAY DEVICE

(71) Applicants: Hefei BOE Display Technology Co., Ltd., Anhui (CN); BOE Technology Group Co., Ltd., Beijing (CN)

(72) Inventors: Liugang Zhou, Beijing (CN); Huiming Wang, Beijing (CN); Jianwei Sun, Beijing (CN); Jun Wang, Beijing (CN); Yunyun Liang, Beijing (CN); Qing Li, Beijing (CN); Yu Quan, Beijing (CN); Yanting Huang, Beijing (CN); Yunlu Chen, Beijing (CN); Zhengru Pan, Beijing (CN)

(73) Assignees: Hefei BOE Display Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/696,296

(22) PCT Filed: Sep. 20, 2022

(86) PCT No.: PCT/CN2022/120043
§ 371 (c)(1),
(2) Date: Mar. 27, 2024

(87) PCT Pub. No.: WO2023/109231
PCT Pub. Date: Jun. 22, 2023

(65) Prior Publication Data

US 2025/0006151 A1 Jan. 2, 2025

(30) Foreign Application Priority Data

Dec. 16, 2021 (CN) ......................... 202111542703.3

(51) Int. Cl.
*G09G 3/36* (2006.01)
*G09G 3/20* (2006.01)

(52) U.S. Cl.
CPC ......... *G09G 3/3614* (2013.01); *G09G 3/2092* (2013.01); *G09G 3/3648* (2013.01);
(Continued)

(58) Field of Classification Search
CPC ..... G09G 3/3611–3666; G09G 3/3685; G09G 3/3688
See application file for complete search history.

(56) References Cited

U.S. PATENT DOCUMENTS

2005/0057470 A1* 3/2005 Tobita ...................... G09G 3/20 345/89
2006/0114220 A1 6/2006 Wang
(Continued)

FOREIGN PATENT DOCUMENTS

CN 1682146 A 10/2005
CN 101354877 A 1/2009
(Continued)

OTHER PUBLICATIONS

PCT/CN2022/120043 international search report dated Oct. 26, 2022.
CN 202111542703.3 first office action dated Jan. 14, 2025.

*Primary Examiner* — Roy P Rabindranath
(74) *Attorney, Agent, or Firm* — IPro, PLLC

(57) ABSTRACT

Disclosed are a driving method of a display panel and a display device. The driving method of the display panel includes: obtaining display data of a current display frame (S100); and inputting a data voltage to a data line according to the display data, so that the corresponding data voltages are charged into sub-pixels electrically connected to the data line (S200), where the data voltages inputted on the data line are divided into a plurality of voltage groups, each voltage group includes at least two adjacent data voltages, the polarities corresponding to the data voltages in a same voltage group are the same, the polarities corresponding to the data voltages of the two adjacent voltage groups inputted into a same data line are different, and the polarities of the corresponding voltage groups on the two adjacent data lines are different.

17 Claims, 16 Drawing Sheets

(52) U.S. Cl.
CPC ......... *G09G 3/3696* (2013.01); *G09G 3/3607* (2013.01); *G09G 2310/08* (2013.01); *G09G 2320/0242* (2013.01); *G09G 2330/021* (2013.01)

(56) References Cited

U.S. PATENT DOCUMENTS

| | | | | |
|---|---|---|---|---|
| 2008/0136804 | A1 | 6/2008 | Lee | |
| 2014/0306871 | A1 | 10/2014 | Lu et al. | |
| 2016/0035301 | A1* | 2/2016 | Neugebauer | G09G 3/3648 345/100 |
| 2018/0182325 | A1* | 6/2018 | Xiong | G09G 3/36 |
| 2020/0286435 | A1* | 9/2020 | Feng | G09G 3/20 |
| 2021/0020130 | A1* | 1/2021 | Shan | G09G 3/3611 |
| 2022/0036842 | A1* | 2/2022 | Li | G09G 3/3688 |
| 2022/0310012 | A1* | 9/2022 | Chung | G09G 3/3233 |
| 2022/0415279 | A1* | 12/2022 | Kang | G09G 3/3614 |

FOREIGN PATENT DOCUMENTS

| | | | |
|---|---|---|---|
| CN | 101572061 | A | 11/2009 |
| CN | 101806968 | A | 8/2010 |
| CN | 101847390 | A | 9/2010 |
| CN | 102254508 | A | 11/2011 |
| CN | 105869596 | A | 8/2016 |
| CN | 106328039 | A | 1/2017 |
| CN | 106773420 | A | 5/2017 |
| CN | 110223624 | A | 9/2019 |
| CN | 111261125 | B | 10/2021 |

* cited by examiner

DRIVING METHOD OF DISPLAY PANEL AND DISPLAY DEVICE

CROSS-REFERENCE TO RELATED APPLICATIONS

This application is a National Stage of International Application No. PCT/CN2022/120043, filed on Sep. 20, 2022, which claims priority to Chinese Patent Application No. 202111542703.3, filed with the China National Intellectual Property Administration on Dec. 16, 2021, and entitled "Driving Method of Display Panel and Display Device", the content of which is hereby incorporated by reference in its entirety.

TECHNICAL FIELD

The present disclosure relates to the technical field of display, and in particular, relates to a driving method for a display panel and a display device.

BACKGROUND

In a display such as a liquid crystal display (LCD), a plurality of pixels are generally included. Each of the pixels may include a red sub-pixel, a green sub-pixel, and a blue sub-pixel.

Display brightness of each of the sub-pixels is controlled by controlling display data corresponding to each of the sub-pixels, so that a color required to be displayed may be obtained by mixing colors of red, green and blue to display a color image.

SUMMARY

A driving method for a display panel according to an embodiment of the present disclosure includes:

obtaining display data of a current display frame; and inputting data voltages to a data line according to the display data, so that a corresponding data voltage is charged into a sub-pixel electrically connected with the data line; wherein the data voltages input on the data line are divided into a plurality of voltage groups, each of the plurality of voltage groups includes at least two adjacent data voltages, and polarities corresponding to data voltages in a same voltage group are same; polarities corresponding to data voltages in two adjacent voltage groups input to a same data line are different; and polarities of corresponding voltage groups on two adjacent data lines are different.

In some embodiments, the driving method further includes: inputting a reference voltage before inputting the data voltage to the data line.

In some embodiments, the driving method further includes: inputting a reference voltage before inputting a first data voltage of the voltage group to the data line.

In some embodiments, the data voltage is formed by dividing a first power supply voltage and a second power supply voltage; where the first power supply voltage is less than the second power supply voltage; and the reference voltage is a voltage between the first power supply voltage and the second power supply voltage.

In some embodiments, the reference voltage is a midpoint voltage between the first power supply voltage and the second power supply voltage.

In some embodiments, the driving method further includes: superimposing a compensation voltage on the data line when inputting a first data voltage of the voltage group to the data line. When the first data voltage corresponds to a positive polarity, a voltage value obtained by superimposing the compensation voltage on the first data voltage is greater than the first data voltage; and when the first data voltage corresponds to a negative polarity, a voltage value obtained by superimposing the compensation voltage on the first data voltage is less than the first data voltage.

In some embodiments, in different voltage groups, compensation voltages superimposed on first data voltages corresponding to the same polarity are the same.

In some embodiments, absolute values of compensation voltages corresponding to each voltage group are the same.

In some embodiments, a maintenance duration of the data voltage loaded on the data line and a maintenance duration of opening of the sub-pixel corresponding to the data voltage have a non-overlapping duration; and in the same voltage group, a first data voltage loaded on the data line has a first non-overlapping duration, and the remaining data voltage loaded on the data line have a second non-overlapping duration; where the first non-overlapping duration is less than the second non-overlapping duration.

In some embodiments, the first non-overlapping duration of the first data voltage corresponding to a positive polarity is less than the first non-overlapping duration of the first data voltage corresponding to a negative polarity.

A display device according to an embodiment of the present disclosure includes:

a timing controller, configured to obtain and output display data of a current display frame; and generate and output a polarity reversal signal based on a rule that: data voltages input on a data line are divided into a plurality of voltage groups, each of the plurality of voltage groups includes at least two adjacent data voltages, polarities corresponding to data voltages in a same voltage group are same, polarities corresponding to data voltages in two adjacent voltage groups input to a same data line are different, and polarities of corresponding voltage groups on two adjacent data lines are different; and a display panel, including a source driving circuit; where the source driving circuit is configured to receive the display data and the polarity reversal signal; and input data voltages to a data line according to the display data and the polarity reversal signal, so that a corresponding data voltage is charged into a sub-pixel electrically connected with the data line.

In some embodiments, the source driving circuit includes: a data processing circuit and a plurality of voltage output circuits. Each of the data lines is electrically connected with one of the plurality of voltage output circuits one by one; the data processing circuit is configured to receive the display data, and output corresponding display data to each of the voltage output circuits according to the display data; and the voltage output circuit is configured to receive the polarity reversal signal and the display data output by the data processing circuit, and successively input the data voltages to the data line electrically connected with the voltage output circuit according to the polarity reversal signal and the display data output by the data processing circuit, so that the corresponding data voltage is charged into the sub-pixel electrically connected with the data line.

In some embodiments, the source driving circuit further includes: a first charge sharing circuit; and the first charge sharing circuit is configured to receive a first reference control signal, and input a reference voltage before inputting each of the data voltages to a data line electrically connected with the first charge sharing circuit, under control of the first reference control signal.

In some embodiments, the reference voltage is input to a corresponding data line when being triggered by a first set edge of the first reference control signal; and the data voltage is input to the corresponding data line when being triggered by a second set edge of the first reference control signal. The first set edge is a rising edge, and the second set edge is a falling edge; or, the first set edge is a falling edge, and the second set edge is a rising edge.

In some embodiments, the first charge sharing circuit includes a first switching transistor; and a gate of the first switching transistor is configured to receive the first reference control signal, a first electrode of the first switching transistor is configured to receive the reference voltage, and a second electrode of the first switching transistor is electrically connected with a data line.

In some embodiments, the source driving circuit further includes: a second charge sharing circuit; and the second charge sharing circuit is configured to receive a second reference control signal, and input a reference voltage before inputting a first data voltage of each of the voltage groups to each of the data lines, under control of the second reference control signal.

In some embodiments, the second reference control signal is the polarity reversal signal.

In some embodiments, the second charge sharing circuit includes a second switching transistor; and a gate of the second switching transistor is configured to receive the second reference control signal, a first electrode of the second switching transistor is configured to receive the reference voltage, and a second electrode of the second switching transistor is electrically connected with a data line.

In some embodiments, the voltage output circuit includes a first output circuit and a second output circuit. Each of the data lines is electrically connected with the first output circuit and the second output circuit one by one; the first output circuit is configured to input a data voltage corresponding to a positive polarity to the data line electrically connected with the first output circuit according to the polarity reversal signal and the display data; and the second output circuit is configured to input a data voltage corresponding to a negative polarity to the data line electrically connected with the second output circuit according to the polarity reversal signal and the display data.

In some embodiments, the first output circuit includes a first digital-to-analog conversion circuit and a first amplifier. A midpoint voltage terminal is provided between a first power supply voltage and a second power supply voltage, and the first digital-to-analog conversion circuit is electrically connected between the second power supply voltage and the midpoint voltage terminal; the first digital-to-analog conversion circuit is configured to receive the polarity reversal signal and the display data, and perform digital-to-analog conversion on the display data according to the polarity reversal signal to generate and output a data voltage corresponding to a positive polarity; and the first amplifier is configured to receive the data voltage output by the first digital-to-analog conversion circuit, amplify the data voltage received and input the data voltage after being amplified to the data line electrically connected with the first amplifier.

In some embodiments, the second output circuit includes a second digital-to-analog conversion circuit and a second amplifier. The midpoint voltage terminal is provided between the first power supply voltage and the second power supply voltage, and the second digital-to-analog conversion circuit is electrically connected between the first power supply voltage and the midpoint voltage terminal; the second digital-to-analog conversion circuit is configured to receive the polarity reversal signal and the display data, and perform digital-to-analog conversion on the display data according to the polarity reversal signal to generate and output a data voltage corresponding to a negative polarity; and the second amplifier is configured to receive the data voltage output by the second digital-to-analog conversion circuit, amplify the data voltage received and input the data voltage after being amplified to the data line electrically connected with the second amplifier.

DETAILED DESCRIPTION

Figure 1:
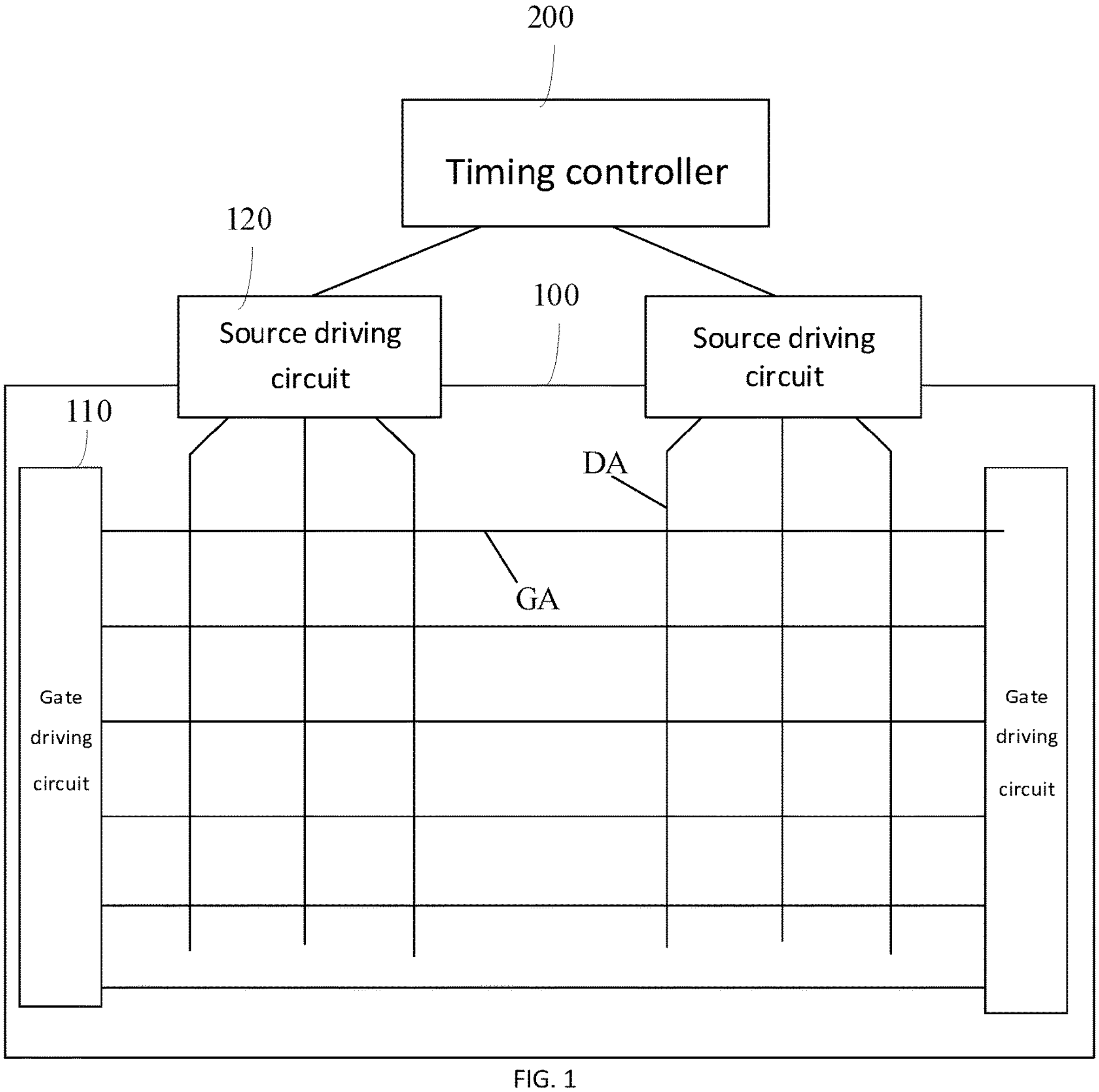
FIG. 1 is a schematic diagram of some structures of a display panel according to an embodiment of the present disclosure.

In order to make the purpose, technical solutions and advantages of embodiments of the present disclosure more clear, the technical solutions of embodiments of the present disclosure will be clearly and completely described below in conjunction with the drawings of embodiments of the present disclosure. Obviously, the described embodiments are some, but not all, of embodiments of the present disclosure. In addition, embodiments and features in the embodiments of the present disclosure may be combined with each other without conflict.

Based on the described embodiments of the present disclosure, all other embodiments obtained by those of ordinary skill in the art without creative efforts fall within the scope of protection of the present disclosure.

Unless otherwise defined, technical or scientific terms used here shall have their ordinary meaning understood by a person of ordinary skill in the art to which this disclosure belongs. "First", "Second" and similar words used in the present disclosure do not indicate any order, quantity or importance, but are only used to distinguish different components. Words such as "include" or "comprise" mean that the element or thing appearing before the word includes the elements or things listed after the word and their equivalents, without excluding other elements or things. Words such as "coupled" or "connected" are not limited to physical or mechanical connections, but may include electrical connections, whether direct or indirect.

It should be noted that the size and shape of each figure in the drawings do not reflect the true scale, but are only intended to illustrate the present disclosure. In addition, the same or similar reference numerals represent the same or similar elements or elements having the same or similar functions throughout.

Figure 2:
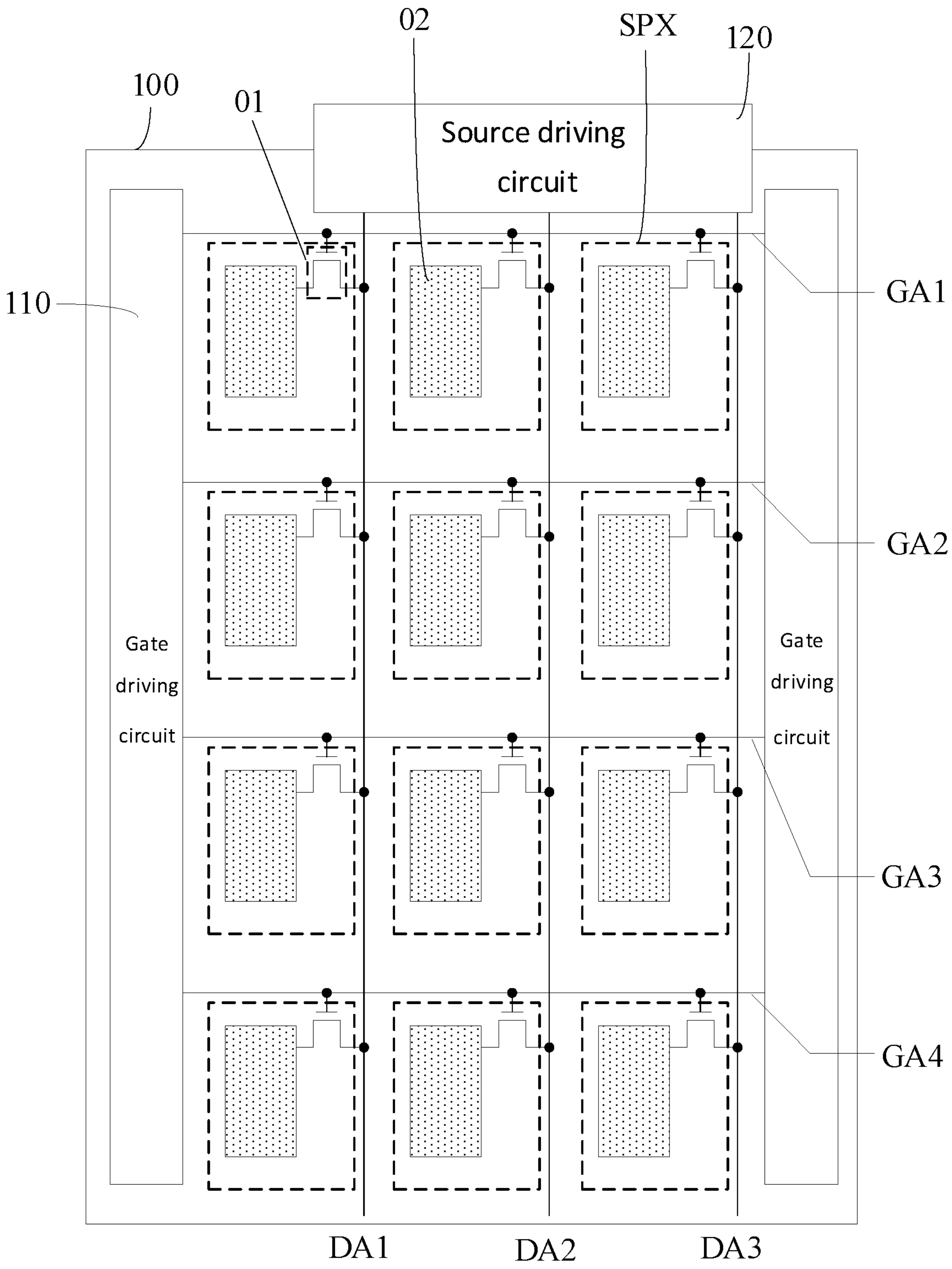
FIG. 2 is a schematic diagram of other structures of a display panel according to an embodiment of the present disclosure.

Referring to FIG. 1 and FIG. 2, a display device may include a display panel 100 and a timing controller 200. The display panel 100 may include a plurality of pixel units arranged in an array, a plurality of gate lines GA (e.g., GA1, GA2, GA3, GA4), a plurality of data lines DA (e.g., DA1, DA2, DA3), a gate driving circuit 110, and a source driving circuit 120. The gate driving circuit 110 is coupled with the gate lines GA1, GA2, GA3 and GA4 respectively; and the source driving circuit 120 is coupled with the data lines DA1, DA2 and DA3 respectively. The timing controller 200 may input a control signal to the gate driving circuit 110 through a level shift circuit, to drive the gate lines GA1, GA2, GA3 and GA4. The timing controller 200 inputs a signal to the source driving circuit 120 so that the source driving circuit 120 inputs a data voltage to a data line, to charge sub-pixels SPX so that a corresponding data voltage is input to the sub-pixel SPX, to realize an image display function. For example, two source driving circuits 120 may be provided, one of the two source driving circuits 120 is connected with half of data lines, and the other source driving circuit 120 is connected with the other half of the data lines. Of course, three, four or more source driving circuits 120 may be provided, which may be designed and determined according to actual application requirements, and is not limited herein.

Illustratively, each pixel unit includes a plurality of sub-pixels SPX. For example, a pixel unit may include a red sub-pixel, a green sub-pixel, and a blue sub-pixel. In this way, colors of red, green and blue may be mixed to realize color display. Alternatively, a pixel unit may also include a red sub-pixel, a green sub-pixel, a blue sub-pixel, and a white sub-pixel. In this way, colors of red, green, blue and white may be mixed to realize color display. Of course, in actual applications, light-emitting colors of the sub-pixels in the pixel unit may be designed and determined according to an actual application environment, which is not limit herein.

Referring to FIG. 2, each of the sub-pixels SPX includes a transistor 01 and a pixel electrode 02. One row of sub-pixels SPX corresponds to one gate line, and one column of sub-pixels SPX corresponds to one data line. A gate of the transistor 01 is electrically connected with a corresponding gate line, a source of the transistor 01 is electrically connected with a corresponding data line, and a drain of the transistor 01 is electrically connected with the pixel electrode 02. It should be noted that a pixel array structure of the present disclosure may also be a double-gate structure, namely, two gate lines are arranged between two adjacent rows of pixels, and this arrangement mode may reduce half of data lines, that is, there is a data line between two adjacent columns of some pixels, and there is no data line between two adjacent columns of some pixels. The specific pixel arrangement structure and the arrangement mode of data lines and scan lines are not limited.

It should be noted that the display panel in an embodiment of the present disclosure may be a liquid crystal display panel. Illustratively, the liquid crystal display panel generally includes an upper substrate and a lower substrate which are aligned, and liquid crystal molecules encapsulated between the upper substrate and the lower substrate. When displaying a picture, since there is a voltage difference between a data voltage loaded on a pixel electrode of each sub-pixel SPX and a common electrode voltage loaded on a common electrode, the voltage difference may form an electric field so that the liquid crystal molecules are deflected under action of the electric field. Because electric fields with different intensities cause different deflection degrees of the liquid crystal molecules, transmittance of the sub-pixel SPX is different, so as to enable the sub-pixel SPX to realize brightness of different gray scales and further display the picture.

The following will be described by an example that a display panel in an embodiment of the present disclosure is a liquid crystal display panel, and a pixel unit includes a red sub-pixel SPX, a green sub-pixel SPX, and a blue sub-pixel SPX. It should be noted that, colors of sub-pixels SPX included in the liquid crystal display panel are not limited thereto.

Gray scales generally mean that a brightness change range between the darkest and the brightest is divided into several parts, so as to control brightness of a screen. For example, taking a displayed image composed of three colors of red, green and blue as an example, each of the colors may show different brightness levels, and the colors of red, green and blue with different brightness levels are combined to form different colors. For example, if gray scales of the liquid crystal display panel include 6 bits, the three colors of red, green, and blue respectively have 64 (i.e., $2^6$) gray scales. The 64 gray scale values range from 0 to 63 respectively. If the gray scales of the liquid crystal display panel include 8 bits, the three colors of red, green, and blue respectively have 256 (i.e., $2^8$) gray scales. The 256 gray scales values range from 0 to 255 respectively. If the gray scales of the liquid crystal display panel include 10 bits, the three colors of red, green, and blue respectively have 1024 (i.e., $2^{10}$) gray scales. The 1024 gray scale values range from 0 to 1023 respectively. If the gray scales of the liquid crystal display panel include 12 bits, the three colors of red, green, and blue have 4096 (i.e., $2^{12}$) gray scales respectively. The 4096 gray scales values range from 0 to 4093 respectively.

Illustratively, taking one sub-pixel SPX as an example, when a data voltage Vda1 input to a pixel electrode of the sub-pixel SPX is greater than a common electrode voltage Vcom, polarities of liquid crystal molecules at the sub-pixel SPX may be positive, and a polarity corresponding to the data voltage Vda1 in the sub-pixel SPX is positive. When a data voltage Vda2 input to the pixel electrode of the sub-pixel SPX is less than the common electrode voltage Vcom, polarities of the liquid crystal molecules at the sub-pixel SPX may be negative, and a polarity corresponding to the data voltage Vda2 in the sub-pixel SPX is negative. For example, the common electrode voltage may be 8.3 V. When a data voltage of 8.8 V to 16 V is input to the pixel electrode of the sub-pixel SPX, the liquid crystal molecules at the sub-pixel SPX may have a positive polarity, and the data voltage of 8.8 V to 16 V is a data voltage corresponding to the positive polarity. When a data voltage of 0.6 V to 7.8 V is input to the pixel electrode of the sub-pixel SPX, the liquid crystal molecules at the sub-pixel SPX may have a negative polarity, and the data voltage of 0.6 V to 7.8 V is a data voltage corresponding to the negative polarity. By way of example, taking 0 to 255 gray scales of 8 bits as an example, when a data voltage of 16 V is input to the pixel electrode of the sub-pixel SPX, the sub-pixel SPX may use a data voltage with a positive polarity to realize brightness of the maximum gray scale value (i.e., a gray scale value of 255). When a data voltage of 0.6 V is input to the pixel electrode of the sub-pixel SPX, the sub-pixel SPX may use a data voltage with a negative polarity to realize brightness of the maximum gray scale value (i.e., the gray scale value of 255). It should be noted that there may be a voltage difference between a data voltage corresponding to a gray scale value of 0 and the common electrode voltage, for example, the common electrode voltage is 8.3 V, a data voltage with a positive polarity corresponding to the gray scale value of 0 may be 8.8 V, and a data voltage with a negative polarity corresponding to the gray scale value of 0 may be 7.8 V. Of course, the data voltage corresponding to the gray scale value of 0 and the common electrode voltage may also be the same. It may be determined according to practical application requirements in practical applications, and is not limited herein.

For example, the data voltage may be formed by dividing a first power supply voltage and a second power supply voltage. The first power supply voltage VY1 is less than the second power supply voltage VY2. For example, there is a midpoint voltage terminal HAVDD between the first power supply voltage VY1 and the second power supply voltage VY2. The midpoint voltage terminal HAVDD may be a voltage signal additionally input through a pin of a chip by an external signal source. In addition, a voltage of the midpoint voltage terminal HAVDD may be ½*(VY2−VY1). Alternatively, the voltage of the midpoint voltage terminal HAVDD may fluctuate within a certain range around ½*(VY2−VY1), which is not limited herein.

For example, a data voltage corresponding to a positive polarity may be formed by dividing the voltage of the midpoint voltage terminal HAVDD and the second power supply voltage, and a data voltage corresponding to a negative polarity may be formed by dividing the voltage of the midpoint voltage terminal HAVDD and the first power supply voltage. For example, the data voltage corresponding to the negative polarity for realizing the maximum gray scale value may be the first power supply voltage VY1. For example, the data voltage corresponding to the negative polarity for realizing the maximum gray scale value may also be greater than the first power supply voltage VY1. For example, the data voltage corresponding to the positive polarity for realizing the maximum gray scale value may be the second power supply voltage VY2. For example, the data voltage corresponding to the positive polarity for realizing the maximum gray scale value may also be less than the second power supply voltage VY2. Illustratively, the first power supply voltage VY1 may be a ground voltage of 0V, the second power supply voltage VY2 may be a high power supply voltage AVDD, and the voltage VHAVDD of the midpoint voltage terminal HAVDD may be equal to ½*AVDD or may fluctuate within a certain range above or below $\overrightarrow{1/2}$*AVDD. In addition, a data voltage of 0.6 V to 7.8 V corresponding to the negative polarity may be generated by dividing the voltage between 0 V and VHAVDD, and a data voltage of 8.8 V to 16 V corresponding to the positive polarity may be generated by dividing the voltage between VHAVDD and AVDD. It should be noted that VHAVDD may be the same as Vcom, or VHAVDD may have a small voltage difference (e.g., 0.1 V, 0.5 V) from Vcom, etc., which is not limited herein.

Figure 3:
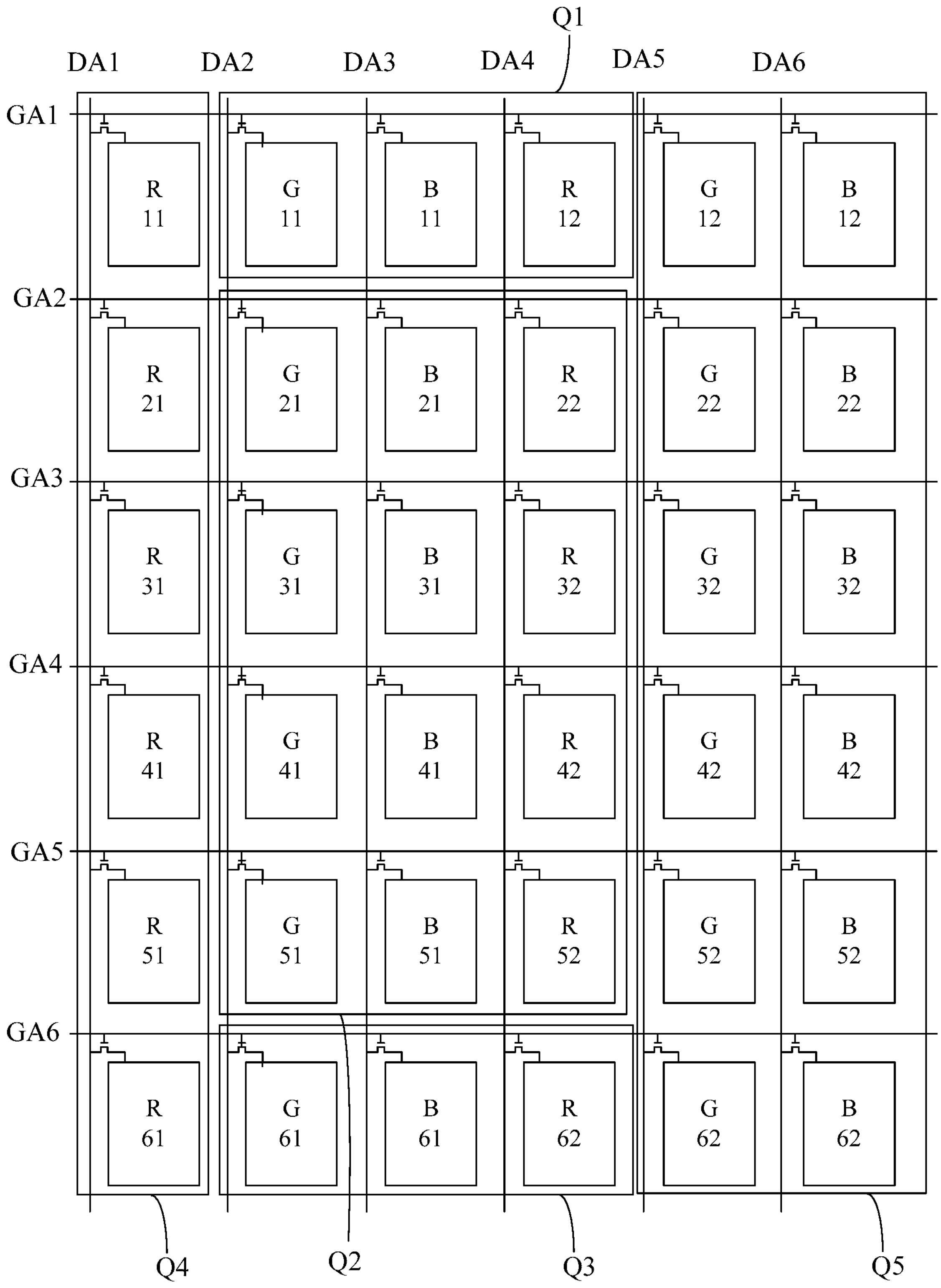
FIG. 3 is a schematic diagram of other structures of a display panel according to an embodiment of the present disclosure.

The following will be described by an example of a pixel unit including a red sub-pixel, a green sub-pixel, and a blue sub-pixel. As shown in FIG. 3, a red sub-pixel R11, a green sub-pixel G11, and a blue sub-pixel B11 constitute a pixel unit; a red sub-pixel R12, a green sub-pixel G12, and a blue sub-pixel B12 constitute a pixel unit; a red sub-pixel R21, a green sub-pixel G21, and a blue sub-pixel B21 constitute a pixel unit; a red sub-pixel R22, a green sub-pixel G22, and a blue sub-pixel B22 constitute a pixel unit; a red sub-pixel R31, a green sub-pixel G31, and a blue sub-pixel B31 constitute a pixel unit; a red sub-pixel R32, a green sub-pixel G32, and a blue sub-pixel B32 constitute a pixel unit; a red sub-pixel R41, a green sub-pixel G41, and a blue sub-pixel B41 constitute a pixel unit; a red sub-pixel R42, a green sub-pixel G42, and a blue sub-pixel B42 constitute a pixel unit; a red sub-pixel R51, a green sub-pixel G51, and a blue sub-pixel B51 constitute a pixel unit; a red sub-pixel R52, a green sub-pixel G52, and a blue sub-pixel B52 constitute a pixel unit; a red sub-pixel R61, a green sub-pixel G61, and a blue sub-pixel B61 constitute a pixel unit; and a red sub-pixel R62, a green sub-pixel G62, and a blue sub-pixel B62 constitute a pixel unit.

Figure 4:
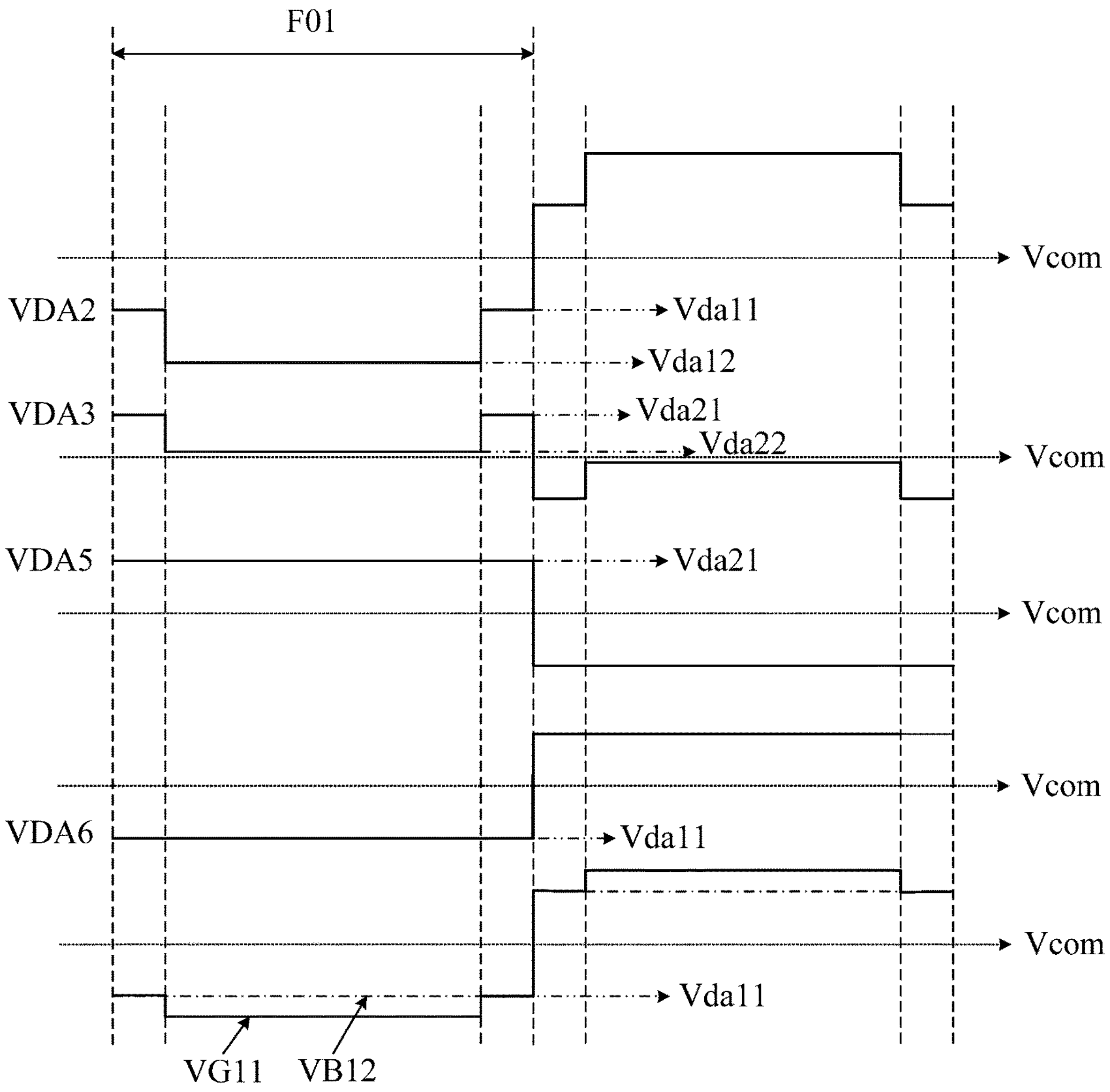
FIG. 4 is a timing diagram of some signals according to an embodiment of the present disclosure.

As shown in FIG. 3 and FIG. 4, when data voltages corresponding to a gray scale value of 127 are input to sub-pixels in regions Q1, Q3, Q4 and Q5, data voltages corresponding to a gray scale value of 255 are input to green sub-pixels in the region Q2, and data voltages corresponding to a gray scale value of 0 are input to remaining sub-pixels, taking column inversion as an example, a data voltage corresponding to a positive polarity is input to red sub-pixels electrically connected with a data line DA1, a data voltage corresponding to a negative polarity is input to green sub-pixels electrically connected with a data line DA2, a data voltage corresponding to a positive polarity is input to blue sub-pixels electrically connected with a data line DA3, a data voltage corresponding to a negative polarity is input to red sub-pixels electrically connected with a data line DA4, a data voltage corresponding to a positive polarity is input to green sub-pixels electrically connected with a data line DA5, and a data voltage corresponding to the negative polarity is input to blue sub-pixels electrically connected with a data line DA6. The data lines DA2, DA3, DA5, and DA6 and the sub-pixels electrically connected therewith will be described below as an example. In FIG. 4, VDA2 represents the data voltage transmitted on the data line DA2, VDA3 represents the data voltage transmitted on the data line DA3, VDA5 represents the data voltage transmitted on the data line DA5, and VDA6 represents the data voltage transmitted on the data line DA6.

In a display frame F01, when GA1 controls the first row of sub-pixels to be turned on, the green sub-pixel G11, the blue sub-pixel B11, the green sub-pixel G12 and the blue sub-pixel B12 are turned on. A data voltage Vda11 with a negative polarity corresponding to a gray scale value of 127 is transmitted to the data line DA2, so that the data voltage Vda11 is input to the green sub-pixel G11. A data voltage Vda21 with a positive polarity corresponding to the gray scale value of 127 is transmitted to the data line DA3, so that the data voltage Vda21 is input to the blue sub-pixel B11. A data voltage Vda21 with a positive polarity corresponding to the gray scale value of 127 is transmitted to the data line DA5, so that the data voltage Vda21 is input to the green sub-pixel G12. A data voltage Vda11 with a negative polarity corresponding to the gray scale value of 127 is transmitted to the data line DA6, so that the data voltage Vda11 is input to the blue sub-pixel B12.

When GA2 controls the second row of sub-pixels to be turned on, the green sub-pixel G21, the blue sub-pixel B21, the green sub-pixel G22 and the blue sub-pixel B22 are turned on. A data voltage Vda12 with a negative polarity corresponding to a gray scale value of 255 is transmitted to the data line DA2, so that the data voltage Vda12 is input to the green sub-pixel G21. A data voltage Vda22 with a positive polarity corresponding to the gray scale value of 0 is transmitted to the data line DA3, so that the data voltage Vda22 is input to the blue sub-pixel B21. A data voltage Vda21 with a positive polarity corresponding to the gray scale value of 127 is transmitted to the data line DA5, so that the data voltage Vda21 is input to the green sub-pixel G22. A data voltage Vda11 with a negative polarity corresponding to the gray scale value of 127 is transmitted to the data line DA6, so that the data voltage Vda11 is input to the blue sub-pixel B22.

When GA3 controls the third row of sub-pixels to be turned on, the green sub-pixel G31, the blue sub-pixel B31, the green sub-pixel G32 and the blue sub-pixel B32 are turned on. A data voltage Vda12 with a negative polarity corresponding to a gray scale value of 255 is transmitted to the data line DA2, so that the data voltage Vda12 is input to the green sub-pixel G31. A data voltage Vda22 with a positive polarity corresponding to the gray scale value of 0 is transmitted to the data line DA3, so that the data voltage Vda22 is input to the blue sub-pixel B31. A data voltage Vda21 with a positive polarity corresponding to the gray scale value of 127 is transmitted to the data line DA5, so that the data voltage Vda21 is input to the green sub-pixel G32. A data voltage Vda11 with a negative polarity corresponding to the gray scale value of 127 is transmitted to the data line DA6, so that the data voltage Vda11 is input to the blue sub-pixel B32.

When GA4 controls the fourth row of sub-pixels to be turned on, the green sub-pixel G41, the blue sub-pixel B41, the green sub-pixel G42 and the blue sub-pixel B42 are turned on. A data voltage Vda12 with a negative polarity corresponding to a gray scale value of 255 is transmitted to the data line DA2, so that the data voltage Vda12 is input to the green sub-pixel G41. A data voltage Vda22 with a positive polarity corresponding to the gray scale value of 0 is transmitted to the data line DA3, so that the data voltage Vda22 is input to the blue sub-pixel B41. A data voltage Vda21 with a positive polarity corresponding to the gray scale value of 127 is transmitted to the data line DA5, so that the data voltage Vda21 is input to the green sub-pixel G42. A data voltage Vda11 with a negative polarity corresponding to the gray scale value of 127 is transmitted to the data line DA6, so that the data voltage Vda11 is input to the blue sub-pixel B42.

When GA5 controls the fifth row of sub-pixels to be turned on, the green sub-pixel G51, the blue sub-pixel B51, the green sub-pixel G52 and the blue sub-pixel B52 are turned on. A data voltage Vda12 with a negative polarity corresponding to a gray scale value of 255 is transmitted to the data line DA2, so that the data voltage Vda12 is input to the green sub-pixel G51. A data voltage Vda22 with a positive polarity corresponding to the gray scale value of 0 is transmitted to the data line DA3, so that the data voltage Vda22 is input to the blue sub-pixel B51. A data voltage Vda21 with a positive polarity corresponding to the gray scale value of 127 is transmitted to the data line DA5, so that the data voltage Vda21 is input to the green sub-pixel G52. A data voltage Vda11 with a negative polarity corresponding to the gray scale value of 127 is transmitted to the data line DA6, so that the data voltage Vda11 is input to the blue sub-pixel B52.

When GA6 controls the sixth row of sub-pixels to be turned on, the green sub-pixel G61, the blue sub-pixel B61, the green sub-pixel G62 and the blue sub-pixel B62 are turned on. A data voltage Vda11 with a negative polarity corresponding to a gray scale value of 127 is transmitted to the data line DA2, so that the data voltage Vda11 is input to the green sub-pixel G61. A data voltage Vda21 with a positive polarity corresponding to the gray scale value of 127 is transmitted to the data line DA3, so that the data voltage Vda21 is input to the blue sub-pixel B61. A data voltage Vda21 with a positive polarity corresponding to the gray scale value of 127 is transmitted to the data line DA5, so that the data voltage Vda21 is input to the green sub-pixel G62. A data voltage Vda11 with a negative polarity corresponding to the gray scale value of 127 is transmitted to the data line DA6, so that the data voltage Vda11 is input to the blue sub-pixel B62.

There is a coupling capacitance between a pixel electrode and a data line adjacent to the pixel electrode, for example, there is a coupling capacitance Cpd11 between the pixel electrode in the green sub-pixel G11 and the data line DA2, and there is a coupling capacitance Cpd12 between the pixel electrode in the green sub-pixel G11 and the data line DA3. As may be seen from FIG. 4 and the above description, VG11 in FIG. 4 represents an actual voltage value on the pixel electrode in the green sub-pixel G11, and VB12 represents an actual voltage value on the pixel electrode in the blue sub-pixel B12. When the data voltage on the data line DA2 jumps from a data voltage Vda11 with a negative polarity corresponding to a gray scale value of 127 to a data voltage Vda12 with a negative polarity corresponding to a gray scale value of 255, due to the coupling capacitance Cpd11, the data voltage Vda11 already charged on the pixel electrode in the green sub-pixel G11 is pulled down, so that the voltage after being pulling is less than Vda11. In addition, when the data voltage on the data line DA3 jumps from a data voltage Vda21 with a positive polarity corresponding to a gray scale value of 127 to a data voltage Vda22 with a positive polarity corresponding to a gray scale value of 0, due to the coupling capacitance Cpd12, the data voltage Vda11 already charged on the pixel electrode in the green sub-pixel G11 is also pulled down, so that the voltage after being pulling is less than Vda11. Because the data voltage on the pixel electrode in the green sub-pixel G11 is pulled down twice, and pulling directions are the same, there is no mutual cancellation and thus the pixel electrode in the green sub-pixel G11 is pulled to a voltage less than Vda11.

For example, there is a coupling capacitance Cpd21 between the pixel electrode in the green sub-pixel G12 and the data line DA5, and there is a coupling capacitance Cpd22 between the pixel electrode in the green sub-pixel G12 and the data line DA6. The data voltage on the data line DA5 is always the data voltage Vda21 with the positive polarity corresponding to the gray scale value of 127, and although there is the coupling capacitance Cpd21, the data voltage Vda21 already charged on the pixel electrode in the green sub-pixel G12 is not pulled. In addition, the data voltage on the data line DA6 is always the data voltage Vda11 with the negative polarity corresponding to the gray scale value of 127, and although there is the coupling capacitance Cpd22, the data voltage Vda21 already charged on the pixel electrode of the green sub-pixel G12 is not pulled. Therefore, the voltage on the pixel electrode of the green sub-pixel G12 is relatively stable at the data voltage Vda21.

In summary, the voltage on the pixel electrode of the green sub-pixel G11 in the region Q1 after being pulled is less than Vda11, while the voltage on the pixel electrode of the green sub-pixel G12 in the region Q5 is relatively stable at the data voltage Vda21. Therefore, brightness of the green sub-pixel G11 in the region Q1 is different from brightness of the green sub-pixel G12 in the region Q5. Therefore, a problem of color deviation occurs, and the display effect is affected.

Figure 5:
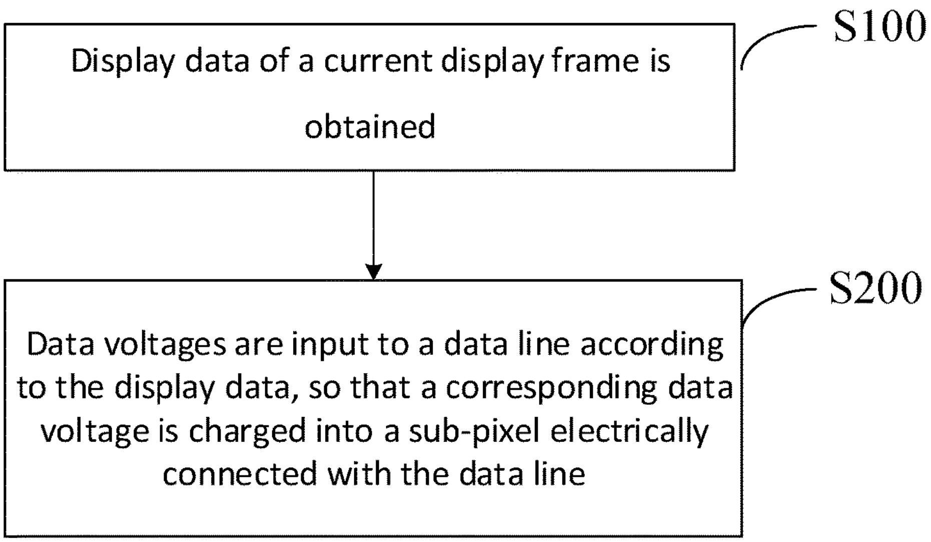
FIG. 5 is some flowcharts of a driving method for a display panel according to an embodiment of the present disclosure.

An embodiment of the present disclosure provides a driving method for a display panel. As shown in FIG. 5, the method may include following steps.

S100: display data of a current display frame is obtained. Illustratively, the display data includes a digital voltage form of a data voltage in one-to-one correspondence for each sub-pixel.

S200: data voltages are input to a data line according to the display data, so that a corresponding data voltage is charged into a sub-pixel electrically connected with the data line. Illustratively, a data voltage is input to each data line according to the display data, so that a corresponding data voltage is charged into a sub-pixel electrically connected with each data line. For one data line, data voltages are sequentially input to the data line, so that corresponding data voltages may be input to sub-pixels electrically connected with the data line.

Figure 6:
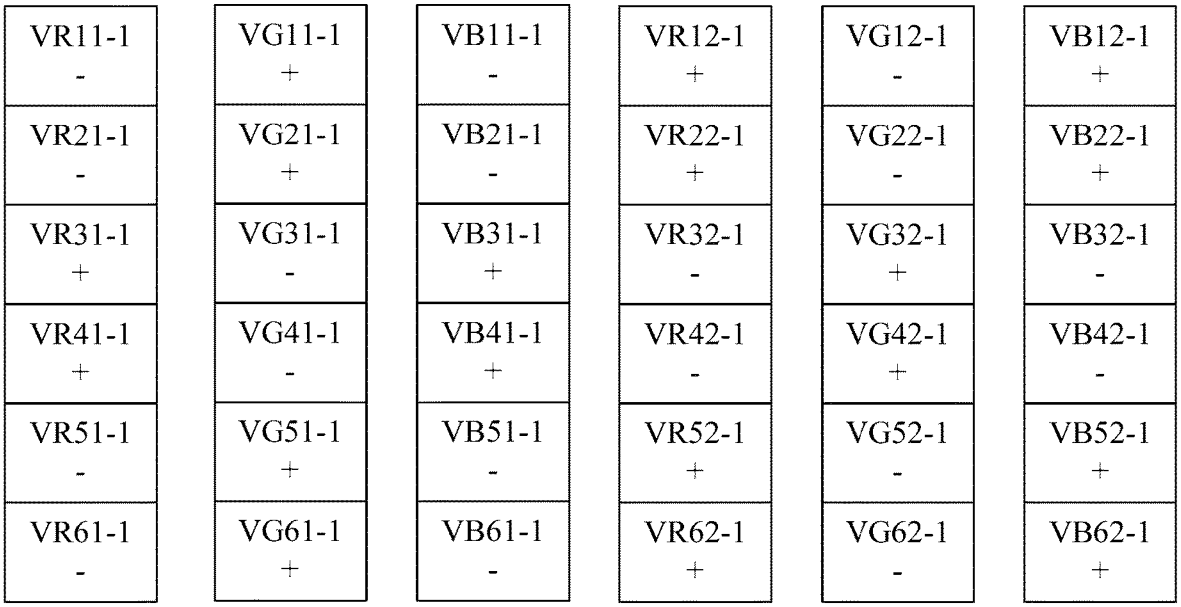
FIG. 6 is a schematic diagram of some data voltages according to an embodiment of the present disclosure.

In an embodiment of the present disclosure, data voltages input on the data line are divided into a plurality of voltage groups, each of the voltage groups includes at least two adjacent data voltages, and polarities corresponding to data voltages in the same voltage group are the same; polarities corresponding to data voltages in two adjacent voltage groups input to the same data line are different; and polarities of corresponding voltage groups on two adjacent data lines are different. Illustratively, each of the voltage groups may include two adjacent data voltages. As shown in FIG. 3 and FIG. 6, taking the data lines DA2, DA3, DA5 and DA6 as an example, "+" represents a positive polarity and "−" represents a negative polarity. A data voltage VR11-1 corresponding to the red sub-pixel R11, a data voltage VR21-1 corresponding to the red sub-pixel R21, a data voltage VR31-1 corresponding to the red sub-pixel R31, a data voltage VR41-1 corresponding to the red sub-pixel R41, a data voltage VR51-1 corresponding to the red sub-pixel R51, and a data voltage VR61-1 corresponding to the red sub-pixel R61 are sequentially input to the data line DAL. The data voltage VR11-1 and the data voltage VR21-1 may constitute a voltage group and correspond to a negative polarity, the data voltage VR31-1 and the data voltage VR41-1 may constitute a voltage group and correspond to a positive polarity, and the data voltage VR51-1 and the data voltage VR61-1 may constitute a voltage group and correspond to a negative polarity.

A data voltage VG11-1 corresponding to the green sub-pixel G11, a data voltage VG21-1 corresponding to the green sub-pixel G21, a data voltage VG31-1 corresponding to the green sub-pixel G31, a data voltage VG41-1 corresponding to the green sub-pixel G41, a data voltage VG51-1 corresponding to the green sub-pixel G51, and a data voltage VG61-1 corresponding to the green sub-pixel G61 are sequentially input to the data line DA2. The data voltage VG11-1 and the data voltage VG21-1 may constitute a voltage group and correspond to a positive polarity, the data voltage VG31-1 and the data voltage VG41-1 may constitute a voltage group and correspond to a negative polarity, and the data voltage VG51-1 and the data voltage VG61-1 may constitute a voltage group and correspond to a positive polarity.

A data voltage VB11-1 corresponding to the blue sub-pixel B11, a data voltage VB21-1 corresponding to the blue sub-pixel B21, a data voltage VB31-1 corresponding to the blue sub-pixel B31, a data voltage VB41-1 corresponding to the blue sub-pixel B41, a data voltage VB51-1 corresponding to the blue sub-pixel B51, and a data voltage VB61-1 corresponding to the blue sub-pixel B61 are sequentially input to the data line DA3. The data voltage VB11-1 and the data voltage VB21-1 may constitute a voltage group and correspond to a negative polarity, the data voltage VB31-1 and the data voltage VB41-1 may constitute a voltage group and correspond to a positive polarity, and the data voltage VB51-1 and the data voltage VB61-1 may constitute a voltage group and correspond to a negative polarity.

A data voltage VR12-1 corresponding to the red sub-pixel R12, a data voltage VR22-1 corresponding to the red sub-pixel R22, a data voltage VR32-1 corresponding to the red sub-pixel R32, a data voltage VR42-1 corresponding to the red sub-pixel R42, a data voltage VR52-1 corresponding to the red sub-pixel R52, and a data voltage VR62-1 corresponding to the red sub-pixel R62 are sequentially input to the data line DA4. The data voltage VR12-1 and the data voltage VR22-1 may constitute a voltage group and correspond to a positive polarity, the data voltage VR32-1 and the data voltage VR42-1 may constitute a voltage group and correspond to a negative polarity, and the data voltage VR52-1 and the data voltage VR62-1 may constitute a voltage group and correspond to a positive polarity.

A data voltage VG12-1 corresponding to the green sub-pixel G12, a data voltage VG22-1 corresponding to the green sub-pixel G22, a data voltage VG32-1 corresponding to the green sub-pixel G32, a data voltage VG42-1 corresponding to the green sub-pixel G42, a data voltage VG52-1 corresponding to the green sub-pixel G52, and a data voltage VG62-1 corresponding to the green sub-pixel G62 are sequentially input to the data line DA5. The data voltage VG12-1 and the data voltage VG22-1 may constitute a voltage group and correspond to a negative polarity, the data voltage VG32-1 and the data voltage VG42-1 may constitute a voltage group and correspond to a positive polarity, and the data voltage VG52-1 and the data voltage VG62-1 may constitute a voltage group and correspond to a negative polarity.

A data voltage VB12-1 corresponding to the blue sub-pixel B12, a data voltage VB22-1 corresponding to the blue sub-pixel B22, a data voltage VB32-1 corresponding to the blue sub-pixel B32, a data voltage VB42-1 corresponding to the blue sub-pixel B42, a data voltage VB52-1 corresponding to the blue sub-pixel B52, and a data voltage VB62-1 corresponding to the blue sub-pixel B62 are sequentially input to the data line DA6. The data voltage VB12-1 and the data voltage VB22-1 may constitute a voltage group and correspond to a positive polarity, the data voltage VB32-1 and the data voltage VB42-1 may constitute a voltage group and correspond to a negative polarity, and the data voltage VB52-1 and the data voltage VB62-1 may constitute a voltage group and correspond to a positive polarity.

Figure 7:
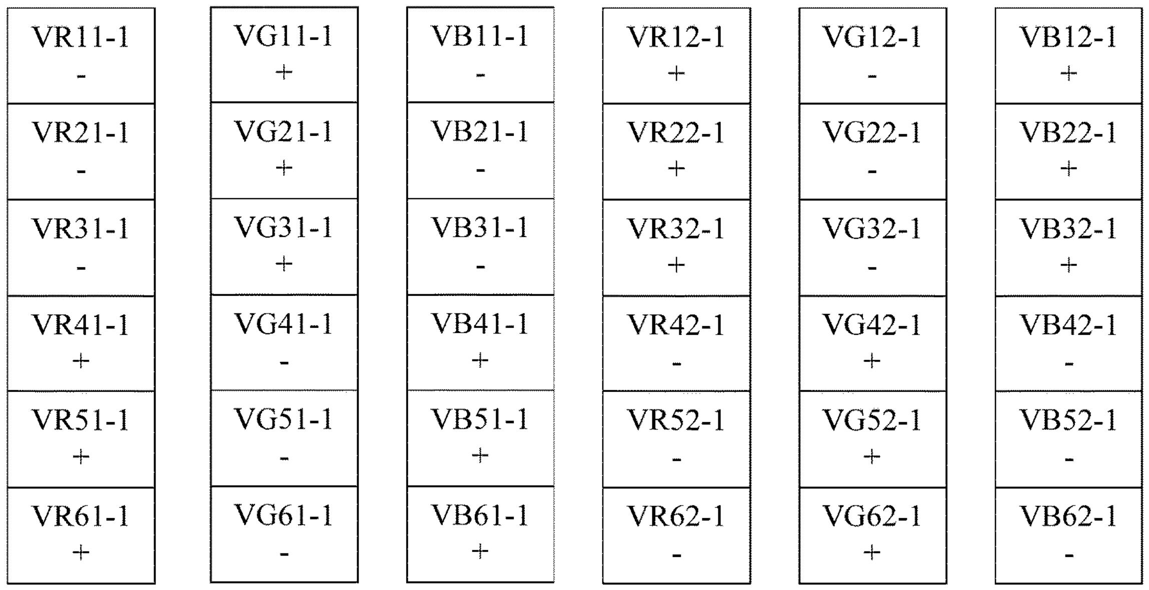
FIG. 7 is a schematic diagram of other data voltages according to an embodiment of the present disclosure.

Illustratively, each of the voltage groups may include three adjacent data voltages. As shown in FIG. 3 and FIG. 7, taking the data lines DA2, DA3, DA5 and DA6 as an example, "+" represents a positive polarity and "−" represents a negative polarity. A data voltage VR11-1 corresponding to the red sub-pixel R11, a data voltage VR21-1 corresponding to the red sub-pixel R21, a data voltage VR31-1 corresponding to the red sub-pixel R31, a data voltage VR41-1 corresponding to the red sub-pixel R41, a data voltage VR51-1 corresponding to the red sub-pixel R51, and a data voltage VR61-1 corresponding to the red sub-pixel R61 are sequentially input to the data line DAL. The data voltage VR11-1, the data voltage VR21-1, and the data voltage VR31-1 may constitute a voltage group and correspond to a negative polarity; and the data voltage VR41-1, the data voltage VR51-1, and the data voltage VR61-1 may constitute a voltage group and correspond to a positive polarity.

A data voltage VG11-1 corresponding to the green sub-pixel G11, a data voltage VG21-1 corresponding to the green sub-pixel G21, a data voltage VG31-1 corresponding to the green sub-pixel G31, a data voltage VG41-1 corresponding to the green sub-pixel G41, a data voltage VG51-1 corresponding to the green sub-pixel G51, and a data voltage VG61-1 corresponding to the green sub-pixel G61 are sequentially input to the data line DA2. The data voltage VG11-1, the data voltage VG21-1, and the data voltage VG31-1 may constitute a voltage group and correspond to a positive polarity; and the data voltage VG41-1, the data voltage VG51-1, and the data voltage VG61-1 may constitute a voltage group and correspond to a negative polarity.

A data voltage VB11-1 corresponding to the blue sub-pixel B11, a data voltage VB21-1 corresponding to the blue sub-pixel B21, a data voltage VB31-1 corresponding to the blue sub-pixel B31, a data voltage VB41-1 corresponding to the blue sub-pixel B41, a data voltage VB51-1 corresponding to the blue sub-pixel B51, and a data voltage VB61-1 corresponding to the blue sub-pixel B61 are sequentially input to the data line DA3. The data voltage VB11-1, the data voltage VB21-1, and the data voltage VB31-1 may constitute a voltage group and correspond to a negative polarity; and the data voltage VB41-1, the data voltage VB51-1, and the data voltage VB61-1 may constitute a voltage group and correspond to a positive polarity.

A data voltage VR12-1 corresponding to the red sub-pixel R12, a data voltage VR22-1 corresponding to the red sub-pixel R22, a data voltage VR32-1 corresponding to the red sub-pixel R32, a data voltage VR42-1 corresponding to the red sub-pixel R42, a data voltage VR52-1 corresponding to the red sub-pixel R52, and a data voltage VR62-1 corresponding to the red sub-pixel R62 are sequentially input to the data line DA4. The data voltage VR12-1, the data voltage VR22-1, and the data voltage VR32-1 may constitute a voltage group and correspond to a positive polarity; and the data voltage VR42-1, the data voltage VR52-1, and the data voltage VR62-1 may constitute a voltage group and correspond to a negative polarity.

A data voltage VG12-1 corresponding to the green sub-pixel G12, a data voltage VG22-1 corresponding to the green sub-pixel G22, a data voltage VG32-1 corresponding to the green sub-pixel G32, a data voltage VG42-1 corresponding to the green sub-pixel G42, a data voltage VG52-1 corresponding to the green sub-pixel G52, and a data voltage VG62-1 corresponding to the green sub-pixel G62 are sequentially input to the data line DA5. The data voltage VG12-1, the data voltage VG22-1, and the data voltage VG32-1 may constitute a voltage group and correspond to a negative polarity; and the data voltage VG42-1, the data voltage VG52-1, and the data voltage VG62-1 may constitute a voltage group and correspond to a positive polarity.

A data voltage VB12-1 corresponding to the blue sub-pixel B12, a data voltage VB22-1 corresponding to the blue sub-pixel B22, a data voltage VB32-1 corresponding to the blue sub-pixel B32, a data voltage VB42-1 corresponding to the blue sub-pixel B42, a data voltage VB52-1 corresponding to the blue sub-pixel B52, and a data voltage VB62-1 corresponding to the blue sub-pixel B62 are sequentially input to the data line DA6. The data voltage VB12-1, the data voltage VB22-1, and the data voltage VB32-1 may constitute a voltage group and correspond to a positive polarity; and the data voltage VB42-1, the data voltage VB52-1, and the data voltage VB62-1 may constitute a voltage group and correspond to a negative polarity.

In practice, each of the voltage groups may also include four, five, or other numbers of data voltages, which may be determined according to actual application requirements, and is not limited herein.

In an embodiment of the present disclosure, polarities of corresponding voltage groups on two adjacent data lines are different, which may mean that polarities corresponding to data voltages input to the two data lines simultaneously are different. For example, a data voltage VR11-1 on the data line DA1, a data voltage VG11-1 on the data line DA2, a data voltage VB11-1 on the data line DA3, a data voltage VR12-1 on the data line DA4, a data voltage VG12-1 on the data line DA5, and a data voltage VB12-1 on the data line DA6 are input simultaneously. After that, a data voltage VR21-1 on the data line DA1, a data voltage VG21-1 on the data line DA2, a data voltage VB21-1 on a data line DA3, a data voltage VR22-1 on the data line DA4, a data voltage VG22-1 on the data line DA5, and a data voltage VB22-1 on the data line DA6 are input simultaneously. After that, a data voltage VR31-1 on the data line DA1, a data voltage VG31-1 on the data line DA2, a data voltage VB31-1 on a data line DA3, a data voltage VR32-1 on the data line DA4, a data voltage VG32-1 on the data line DA5, and a data voltage VB32-1 on the data line DA6 are input simultaneously. After that, a data voltage VR41-1 on the data line DA1, a data voltage VG41-1 on the data line DA2, a data voltage VB41-1 on a data line DA3, a data voltage VR42-1 on the data line DA4, a data voltage VG42-1 on the data line DA5, and a data voltage VB42-1 on the data line DA6 are input simultaneously. After that, a data voltage VR51-1 on the data line DA1, a data voltage VG51-1 on the data line DA2, a data voltage VB51-1 on the data line DA3, a data voltage VR52-1 on the data line DA4, a data voltage VG52-1 on the data line DA5, and a data voltage VB52-1 on the data line DA6 are input simultaneously. After that, a data voltage VR61-1 on the data line DA1, a data voltage VG61-1 on the data line DA2, a data voltage VB61-1 on the data line DA3, a data voltage VR62-1 on the data line DA4, a data voltage VG62-1 on the data line DA5, and a data voltage VB62-1 on the data line DA6 are input simultaneously.

Figure 8:
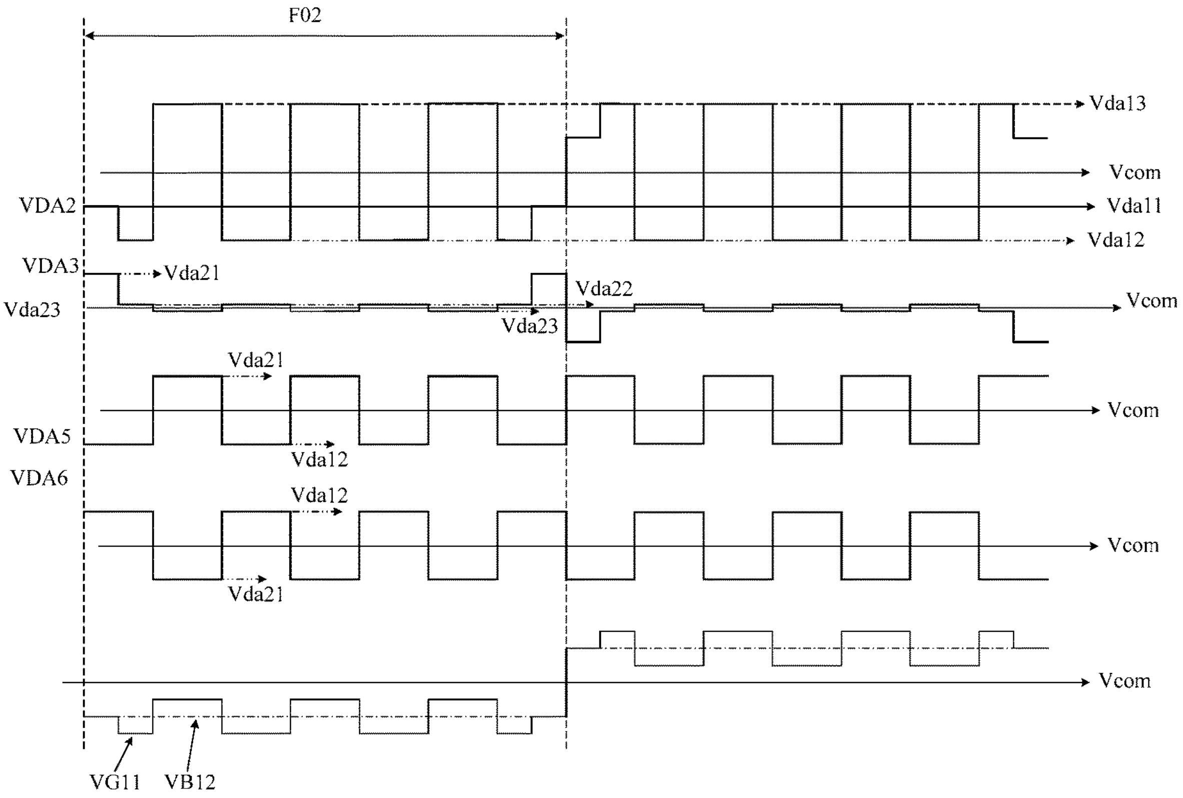
FIG. 8 is a timing diagram of other signals according to an embodiment of the present disclosure.

Illustratively, as shown in conjunction with FIG. 8, VDA2 represents the data voltage transmitted on the data line DA2, VDA3 represents the data voltage transmitted on the data line DA3, VDA5 represents the data voltage transmitted on the data line DA5, and VDA6 represents the data voltage transmitted on the data line DA6. VG11 represents the actual voltage value on the pixel electrode in the green sub-pixel G11, and VB12 represents the actual voltage value on the pixel electrode in the blue sub-pixel B12. By alternately inputting the voltage group with the negative polarity and the voltage group with the positive polarity on the data line DA5, and alternately inputting the voltage group with the positive polarity and the voltage group with the negative polarity on the data line DA6, data voltages charged into the green sub-pixel G12 in the region Q5 may be made to cancel each other out between pull-down and pull-up. Therefore, the voltage on the pixel electrode may be relatively stable, and further the brightness of the green sub-pixel G12 may be relatively stable. In addition, by alternately inputting the voltage group with the negative polarity and the voltage group with the positive polarity on the data line DA2, and alternately inputting the voltage group with the positive polarity and the voltage group with the negative polarity on the data line DA3, data voltages charged into the green sub-pixel G11 in the region Q1 may be alternated between pull-down and pull-up, so that brightness of the green sub-pixel G11 may appear alternate complementary color flickering after passing through each voltage group, which may appear as no color deviation at the macro level, alleviating the color deviation phenomenon.

Figure 10:
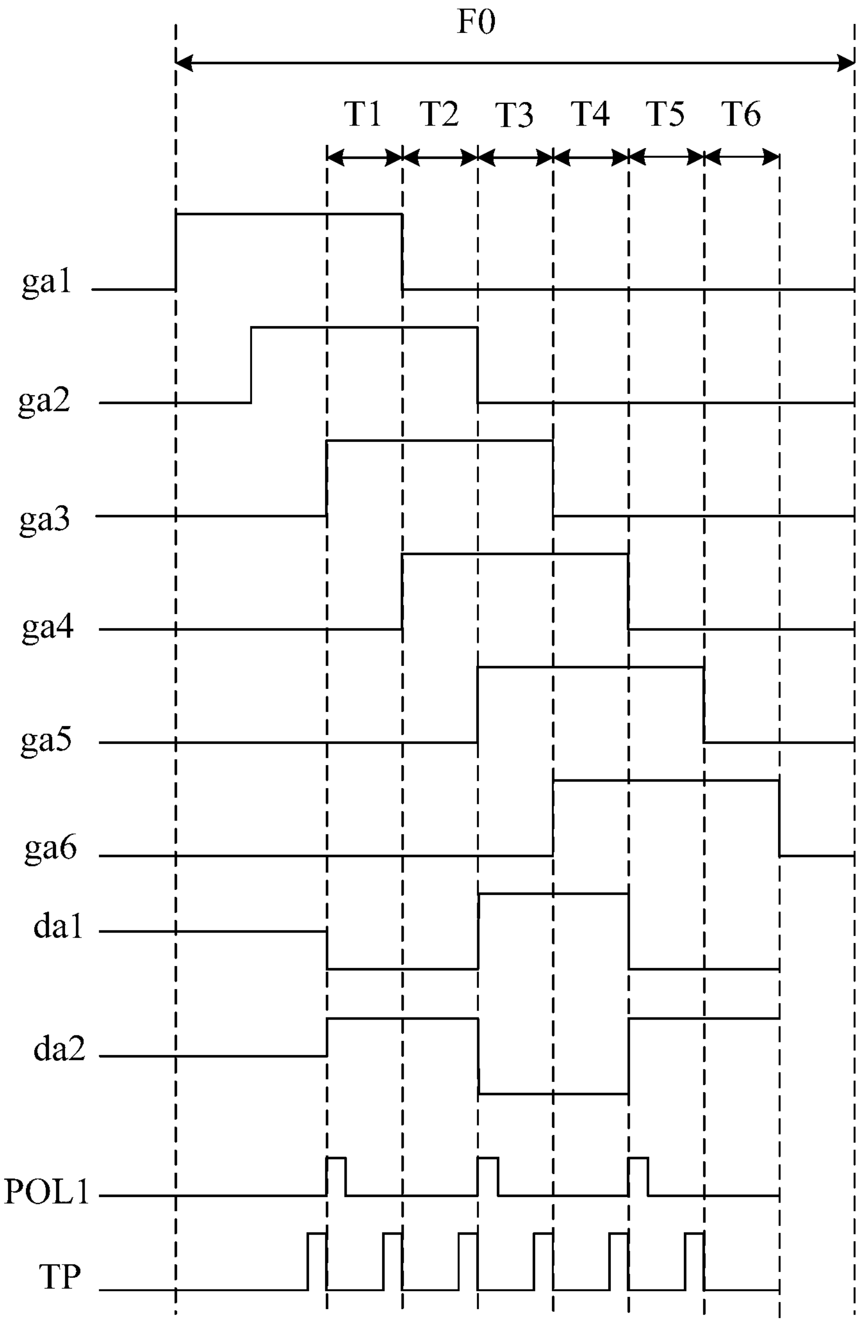
FIG. 10 is a timing diagram of other signals according to an embodiment of the present disclosure.

According to an embodiment of the present disclosure, the timing controller 200 may obtain display data of a current display frame F0, and store the display data corresponding to the current display frame in the form of a digital voltage. The timing controller 200 may generate a polarity reversal signal POL1 (as shown in FIG. 10) based on a rule that: data voltages input on a data line are divided into a plurality of voltage groups, each of the voltage groups includes at least two adjacent data voltages, polarities corresponding to data voltages in the same voltage group are the same, polarities corresponding to data voltages in two adjacent voltage groups input to the same data line are different, and polarities of corresponding voltage groups on two adjacent data lines are different. The timing controller 200 sends the display data in the form of a digital signal and the generated polarity reversal signal POL1 to the source driving circuit 120; and the source driving circuit 120 may receive the display data and the polarity reversal signal POL1 sent by the timing controller 200, and thus input data voltages to a data line according to the display data, the polarity reversal signal and a data loading signal TP, so that a corresponding data voltage is charged into a sub-pixel electrically connected with the data line. Illustratively, the source driving circuit 120 may reverse a polarity of a data voltage loaded on a data line in response to a falling edge of the polarity reversal signal POL1, and load a data voltage to the data line in response to a falling edge of a data loading signal TP. Of course, the source driving circuit 120 may also reverse the polarity of a data voltage loaded on the data line in response to a rising edge of the polarity reversal signal POLL. The source driving circuit 120 may also load a data voltage to the data line in response to a rising edge of the data loading signal TP. These may be determined according to actual application requirements, and are not limited herein.

Figure 9:
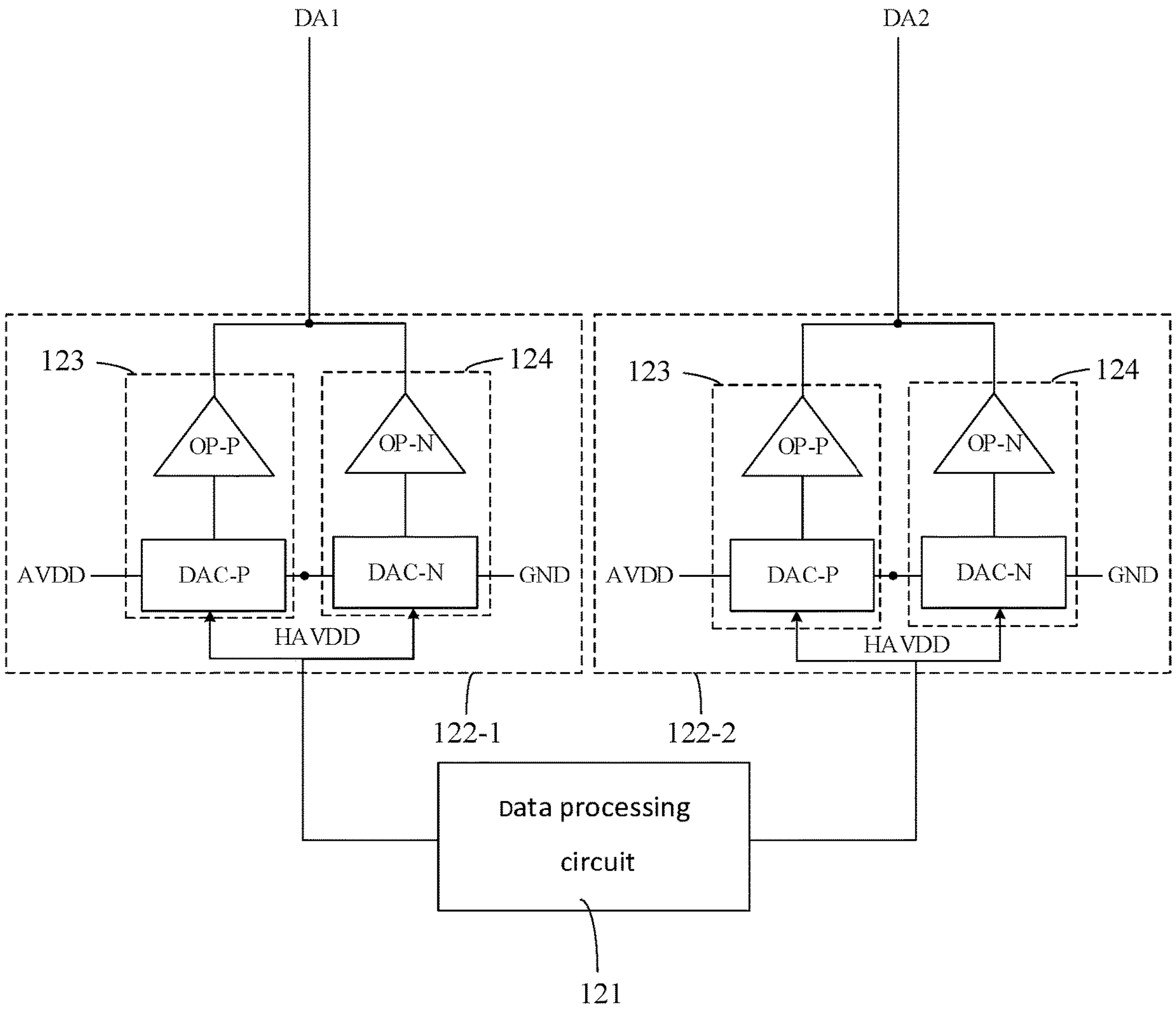
FIG. 9 is a schematic diagram of some structures of a source driving circuit according to an embodiment of the present disclosure.

In an embodiment of the present disclosure, as shown in FIG. 2, FIG. 9 and FIG. 10, the source driving circuit 120 may include a data processing circuit 121 and a plurality of voltage output circuits (e.g., 122-1, 122-2). Each of the data lines is electrically connected with one of the voltage output circuits one by one (for example, the data line DA1 is electrically connected with the voltage output circuit 122-1; and the data line DA2 is electrically connected with the voltage output circuit 122-2). Furthermore, the data processing circuit 121 may receive the display data, and output corresponding display data to each of the voltage output circuits according to the display data. The data processing circuit 121 may optimize the display data, and output the display data after optimization to each of the voltage output circuits. In addition, the voltage output circuit may receive the polarity reversal signal POL1 and the display data output by the data processing circuit 121, and sequentially input data voltages to a data line electrically connected with the voltage output circuit according to the polarity reversal signal and the display data output by the data processing circuit 121, so that corresponding data voltages are charged into the sub-pixels electrically connected with the data line. For example, the data processing circuit 121 may generate the data loading signal TP according to the display data, and output the data loading signal TP, the polarity reversal signal POL1, and the display data corresponding to the sub-pixels electrically connected with the data line DA1 to the voltage output circuit 122-1. The voltage output circuit 122-1 may control the display data to be loaded on the data line DA1 through the data loading signal TP, and control polarity reversal corresponding to the display data through the polarity reversal signal POLL. In addition, the data processing circuit 121 may generate the data loading signal TP according to the display data, and output the data loading signal TP, the polarity reversal signal POL1, and the display data corresponding to the sub-pixels electrically connected with the data line DA2 to the voltage output circuit 122-2. The voltage output circuit 122-2 may control the display data to be loaded on the data line DA2 through the data loading signal TP, and control polarity reversal corresponding to the display data through the polarity reversal signal POLL.

In an embodiment of the present disclosure, as shown in FIG. 2 and FIG. 9, the voltage output circuit may include a first output circuit 123 and a second output circuit 124. Each of the data lines is electrically connected with the first output circuit 123 and the second output circuit 124 one by one. The first output circuit 123 is configured to input a data voltage corresponding to a positive polarity to the data line electrically connected with the first output circuit 123 according to the polarity reversal signal and the display data. The second output circuit 124 is configured to input a data voltage corresponding to a negative polarity to the data line electrically connected with the second output circuit according to the polarity reversal signal and the display data. For example, the voltage output circuit 122-1 includes a first output circuit 123 and a second output circuit 124. The first output circuit 123 may input a data voltage corresponding to a positive polarity to a data line DA1 electrically connected with the first output circuit 123 according to the polarity reversal signal POL1 and the display data. The second output circuit 124 may input a data voltage corresponding to a negative polarity to the data line DA1 electrically connected with the second output circuit 124 according to the polarity reversal signal POL1 and the display data.

In an embodiment of the present disclosure, as shown in FIG. 9, the first output circuit 123 may include a first digital-to-analog conversion circuit DAC-P and a first amplifier OP-P. The first digital-to-analog conversion circuit DAC-P is electrically connected between a second power supply voltage and a midpoint voltage HAVDD. The first digital-to-analog conversion circuit DAC-P is configured to receive the polarity reversal signal and the display data, and perform digital-to-analog conversion on the display data according to the polarity reversal signal to generate and output a data voltage corresponding to a positive polarity. The first amplifier OP-P is configured to receive the data voltage output by the first digital-to-analog conversion circuit DAC-P, amplify the data voltage received and input the data voltage after being amplified to a data line electrically connected with the second amplifier OP-P.

In an embodiment of the present disclosure, as shown in FIG. 9, the second output circuit 124 may include a second digital-to-analog conversion circuit DAC-N and a second amplifier OP-N. The second digital-to-analog conversion circuit DAC-N is electrically connected between a first power supply voltage and the midpoint voltage HAVDD. The second digital-to-analog conversion circuit DAC-N is configured to receive the polarity reversal signal and the display data, and perform digital-to-analog conversion on the display data according to the polarity reversal signal to generate and output a data voltage corresponding to a negative polarity. The second amplifier OP-N is configured to receive the data voltage output by the second digital-to-analog conversion circuit DAC-N, amplify the data voltage received and input the data voltage after being amplified to a data line electrically connected with the second amplifier OP-N.

Taking the data lines DA1 and DA2 and sub-pixels electrically connected therewith as an example, a working process of the display panel according to embodiments of the present disclosure is described with reference to FIG. 3, FIG. 9 and FIG. 10. The ga1 represents a signal loaded on the gate line GA1, the ga2 represents a signal loaded on the gate line GA2, the ga3 represents a signal loaded on the gate line GA3, the ga4 represents a signal loaded on the gate line GA4, the ga5 represents a signal loaded on the gate line GA5, and the ga6 represents a signal loaded on the gate line GA6. The da1 represents a data voltage loaded on the data line DA1, and the da2 represents a data voltage loaded on the data line DA2. Furthermore, high levels of the signals ga1 to ga6 may be used as gate-on signals to control the transistors in the sub-pixels to be turned on. Gate-on signals may be sequentially loaded on the gate lines GA1 to GA6.

In a display frame F0, when the signal ga1 on the gate line GA1 outputs a gate-on signal with a high level, transistors in the red sub-pixel R11 and the green sub-pixel G11 are turned on. In a time period T1 corresponding to the high level of the signal ga1, the data processing circuit 121 outputs the display data corresponding to the red sub-pixel R11, the data loading signal TP, and the polarity reversal signal POL1 to the first digital-to-analog conversion circuit DAC-P in the voltage output circuit 122-1. The first digital-to-analog conversion circuit DAC-P may perform digital-to-analog conversion on the display data corresponding to the red sub-pixel R11 to obtain a data voltage Vr11 of an analog voltage, control the data voltage Vr11 to be loaded on the data line DA1 through the data loading signal TP, and control a polarity of the data voltage Vr11 to be negative through the polarity reversal signal POLL. After the data voltage Vr11 is amplified by the first amplifier OP-P, the data voltage Vr11 with a negative polarity corresponding to the display data is loaded on the data line DA1, so that the data voltage Vr11 is input to the red sub-pixel R11. In addition, the data processing circuit 121 outputs the display data corresponding to the green sub-pixel G11, the data loading signal TP, and the polarity reverse signal POL1 to the first digital-to-analog conversion circuit DAC-P in the voltage output circuit 122-2. The first digital-to-analog conversion circuit DAC-P may perform digital-to-analog conversion on the display data corresponding to the green sub-pixel G11 to obtain a data voltage Vg11 of an analog voltage, control the data voltage Vg11 to be loaded on the data line DA2 through the data loading signal TP, and control a polarity of the data voltage Vg11 to be positive through the polarity reversal signal POLL. After the data voltage Vg11 is amplified by the first amplifier OP-P, the data voltage Vg11 with a positive polarity corresponding to the display data is loaded on the data line DA2, so that the data voltage Vg11 is input to the green sub-pixel G11. In addition, in the time period T1, the signal ga2 on the gate line GA2 outputs a gate-on signal with a high level, and transistors in the red sub-pixel R21 and the green sub-pixel G21 are turned on. The data voltage Vr11 is simultaneously input to the red sub-pixel R21 to pre-charge the red sub-pixel R21. The data voltage Vg11 is simultaneously input to the green sub-pixel G21 to pre-charge the green sub-pixel G21. In addition, in the time period T1, the signal ga3 on the gate line GA3 outputs a gate-on signal with a high level, and transistors in the red sub-pixel R31 and the green sub-pixel G31 are turned on. The data voltage Vr11 is simultaneously input to the red sub-pixel R31 to pre-charge the red sub-pixel R31. The data voltage Vg11 is simultaneously input to the green sub-pixel G31 to pre-charge the green sub-pixel G31.

In a time period T2 corresponding to the high level of the signal ga2, the data processing circuit 121 outputs the display data corresponding to the red sub-pixel R21, the data loading signal TP, and the polarity reversal signal POL1 to the first digital-to-analog conversion circuit DAC-P in the voltage output circuit 122-1. The first digital-to-analog conversion circuit DAC-P may perform digital-to-analog conversion on the display data corresponding to the red sub-pixel R21 to obtain a data voltage Vr21 of an analog voltage, control the data voltage Vr21 to be loaded on the data line DA1 through the data loading signal TP, and control a polarity of the data voltage Vr21 to be negative through the polarity reversal signal POLL. After the data voltage Vr21 is amplified by the first amplifier OP-P, the data voltage Vr21 with a negative polarity corresponding to the display data is loaded on the data line DA1, so that the data voltage Vr21 is charged into the red sub-pixel R21. In addition, the data processing circuit 121 outputs the display data corresponding to the green sub-pixel G21, the data loading signal TP, and the polarity reverse signal POL1 to the first digital-to-analog conversion circuit DAC-P in the voltage output circuit 122-2. The first digital-to-analog conversion circuit DAC-P may perform digital-to-analog conversion on the display data corresponding to the green sub-pixel G21 to obtain a data voltage Vg21 of an analog voltage, control the data voltage Vg21 to be loaded on the data line DA2 through the data loading signal TP, and control a polarity of the data voltage Vg21 to be positive through the polarity reversal signal POLL. After the data voltage Vg21 is amplified by the first amplifier OP-P, the data voltage Vg21 with a positive polarity corresponding to the display data is loaded on the data line DA2, so that the data voltage Vg21 is charged into the green sub-pixel G21. In addition, in the time period T2, the signal ga3 on the gate line GA3 outputs a gate-on signal with a high level, and transistors in the red sub-pixel R31 and the green sub-pixel G31 are turned on. The data voltage Vr21 is simultaneously input to the red sub-pixel R31 to pre-charge the red sub-pixel R31. The data voltage Vg21 is simultaneously input to the green sub-pixel G31 to pre-charge the green sub-pixel G31. In addition, in the time period T2, the signal ga4 on the gate line GA4 outputs a gate-on signal with a high level, and transistors in the red sub-pixel R41 and the green sub-pixel G41 are turned on. The data voltage Vr21 is simultaneously input to the red sub-pixel R41 to pre-charge the red sub-pixel R41. The data voltage Vg21 is simultaneously input to the green sub-pixel G41 to pre-charge the green sub-pixel G41.

In a time period T3 corresponding to the high level of the signal ga3, the data processing circuit 121 outputs the display data corresponding to the red sub-pixel R31, the data loading signal TP, and the polarity reversal signal POL1 to the first digital-to-analog conversion circuit DAC-P in the voltage output circuit 122-1. The first digital-to-analog conversion circuit DAC-P may perform digital-to-analog conversion on the display data corresponding to the red sub-pixel R31 to obtain a data voltage Vr31 of an analog voltage, control the data voltage Vr31 to be loaded on the data line DA1 through the data loading signal TP, and control a polarity of the data voltage Vr31 to be positive through the polarity reversal signal POLL. After the data voltage Vr31 is amplified by the first amplifier OP-P, the data voltage Vr31 with a positive polarity corresponding to the display data is loaded on the data line DA1, so that the data voltage Vr31 is charged into the red sub-pixel R31. In addition, the data processing circuit 121 outputs the display data corresponding to the green sub-pixel G31, the data loading signal TP, and the polarity reverse signal POL1 to the first digital-to-analog conversion circuit DAC-P in the voltage output circuit 122-2. The first digital-to-analog conversion circuit DAC-P may perform digital-to-analog conversion on the display data corresponding to the green sub-pixel G31 to obtain a data voltage Vg31 of an analog voltage, control the data voltage Vg31 to be loaded on the data line DA2 through the data loading signal TP, and control a polarity of the data voltage Vg31 to be negative through the polarity reversal signal POLL. After the data voltage Vg31 is amplified by the first amplifier OP-P, the data voltage Vg31 with a negative polarity corresponding to the display data is loaded on the data line DA2, so that the data voltage Vg31 is charged into the green sub-pixel G31. In addition, in the time period T3, the signal ga4 on the gate line GA4 outputs a gate-on signal with a high level, and transistors in the red sub-pixel R41 and the green sub-pixel G41 are turned on. The data voltage Vr31 is simultaneously input to the red sub-pixel R41 to pre-charge the red sub-pixel R41. The data voltage Vg31 is simultaneously input to the green sub-pixel G41 to pre-charge the green sub-pixel G41. In addition, in the time period T3, the signal ga5 on the gate line GA5 outputs a gate-on signal with a high level, and transistors in the red sub-pixel R51 and the green sub-pixel G51 are turned on. The data voltage Vr31 is simultaneously input to the red sub-pixel R51 to pre-charge the red sub-pixel R51. The data voltage Vg31 is simultaneously input to the green sub-pixel G51 to pre-charge the green sub-pixel G51.

In a time period T4 corresponding to the high level of the signal ga4, the data processing circuit 121 outputs the display data corresponding to the red sub-pixel R41, the data loading signal TP, and the polarity reversal signal POL1 to the first digital-to-analog conversion circuit DAC-P in the voltage output circuit 122-1. The first digital-to-analog conversion circuit DAC-P may perform digital-to-analog conversion on the display data corresponding to the red sub-pixel R41 to obtain a data voltage Vr41 of an analog voltage, control the data voltage Vr41 to be loaded on the data line DA1 through the data loading signal TP, and control a polarity of the data voltage Vr41 to be positive through the polarity reversal signal POLL. After the data voltage Vr41 is amplified by the first amplifier OP-P, the data voltage Vr41 with a positive polarity corresponding to the display data is loaded on the data line DA1, so that the data voltage Vr41 is charged into the red sub-pixel R41. In addition, the data processing circuit 121 outputs the display data corresponding to the green sub-pixel G41, the data loading signal TP, and the polarity reverse signal POL1 to the first digital-to-analog conversion circuit DAC-P in the voltage output circuit 122-2. The first digital-to-analog conversion circuit DAC-P may perform digital-to-analog conversion on the display data corresponding to the green sub-pixel G41 to obtain a data voltage Vg41 of an analog voltage, control the data voltage Vg41 to be loaded on the data line DA2 through the data loading signal TP, and control a polarity of the data voltage Vg41 to be negative through the polarity reversal signal POLL. After the data voltage Vg41 is amplified by the first amplifier OP-P, the data voltage Vg41 with a negative polarity corresponding to the display data is loaded on the data line DA2, so that the data voltage Vg41 is charged into the green sub-pixel G41. In addition, in the time period T4, the signal ga5 on the gate line GA5 outputs a gate-on signal with a high level, and transistors in the red sub-pixel R51 and the green sub-pixel G51 are turned on. The data voltage Vr41 is simultaneously input to the red sub-pixel R51 to pre-charge the red sub-pixel R51. The data voltage Vg41 is simultaneously input to the green sub-pixel G51 to pre-charge the green sub-pixel G51. In addition, in the time period T4, the signal ga6 on the gate line GA6 outputs a gate-on signal with a high level, and transistors in the red sub-pixel R61 and the green sub-pixel G61 are turned on. The data voltage Vr41 is simultaneously input to the red sub-pixel R61 to pre-charge the red sub-pixel R61. The data voltage Vg41 is simultaneously input to the green sub-pixel G61 to pre-charge the green sub-pixel G61.

In a time period T5 corresponding to the high level of the signal ga5, the data processing circuit 121 outputs the display data corresponding to the red sub-pixel R51, the data loading signal TP, and the polarity reversal signal POL1 to the first digital-to-analog conversion circuit DAC-P in the voltage output circuit 122-1. The first digital-to-analog conversion circuit DAC-P may perform digital-to-analog conversion on the display data corresponding to the red sub-pixel R51 to obtain a data voltage Vr51 of an analog voltage, control the data voltage Vr51 to be loaded on the data line DA1 through the data loading signal TP, and control a polarity of the data voltage Vr51 to be negative through the polarity reversal signal POLL. After the data voltage Vr51 is amplified by the first amplifier OP-P, the data voltage Vr51 with a negative polarity corresponding to the display data is loaded on the data line DA1, so that the data voltage Vr51 is charged into the red sub-pixel R51. In addition, the data processing circuit 121 outputs the display data corresponding to the green sub-pixel G51, the data loading signal TP, and the polarity reverse signal POL1 to the first digital-to-analog conversion circuit DAC-P in the voltage output circuit 122-2. The first digital-to-analog conversion circuit DAC-P may perform digital-to-analog conversion on the display data corresponding to the green sub-pixel G51 to obtain a data voltage Vg51 of an analog voltage, control the data voltage Vg51 to be loaded on the data line DA2 through the data loading signal TP, and control a polarity of the data voltage Vg51 to be positive through the polarity reversal signal POLL. After the data voltage Vg51 is amplified by the first amplifier OP-P, the data voltage Vg51 with a positive polarity corresponding to the display data is loaded on the data line DA2, so that the data voltage Vg51 is charged into the green sub-pixel G51. In addition, in the time period T5, the signal ga6 on the gate line GA6 outputs a gate-on signal with a high level, and transistors in the red sub-pixel R61 and the green sub-pixel G61 are turned on. The data voltage Vr51 is simultaneously input to the red sub-pixel R61 to pre-charge the red sub-pixel R61. The data voltage Vg51 is simultaneously input to the green sub-pixel G61 to pre-charge the green sub-pixel G61.

In a time period T6 corresponding to the high level of the signal ga6, the data processing circuit 121 outputs the display data corresponding to the red sub-pixel R61, the data loading signal TP, and the polarity reversal signal POL1 to the first digital-to-analog conversion circuit DAC-P in the voltage output circuit 122-1. The first digital-to-analog conversion circuit DAC-P may perform digital-to-analog conversion on the display data corresponding to the red sub-pixel R61 to obtain a data voltage Vr61 of an analog voltage, control the data voltage Vr61 to be loaded on the data line DA1 through the data loading signal TP, and control a polarity of the data voltage Vr61 to be negative through the polarity reversal signal POLL. After the data voltage Vr61 is amplified by the first amplifier OP-P, the data voltage Vr61 with a negative polarity corresponding to the display data is loaded on the data line DA1, so that the data voltage Vr61 is charged into the red sub-pixel R61. The next red sub-pixel is pre-charged. In addition, the data processing circuit 121 outputs the display data corresponding to the green sub-pixel G61, the data loading signal TP, and the polarity reverse signal POL1 to the first digital-to-analog conversion circuit DAC-P in the voltage output circuit 122-2. The first digital-to-analog conversion circuit DAC-P may perform digital-to-analog conversion on the display data corresponding to the green sub-pixel G61 to obtain a data voltage Vg61 of an analog voltage, control the data voltage Vg61 to be loaded on the data line DA2 through the data loading signal TP, and control a polarity of the data voltage Vg61 to be positive through the polarity reversal signal POLL. After the data voltage Vg61 is amplified by the first amplifier OP-P, the data voltage Vg61 with a positive polarity corresponding to the display data is loaded on the data line DA2, so that the data voltage Vg61 is charged into the green sub-pixel G61. The next green sub-pixel is pre-charged.

Implementations of other sub-pixels are similar until data voltages are charged into sub-pixels in the whole display panel, which will not be repeated herein.

Figure 11A:
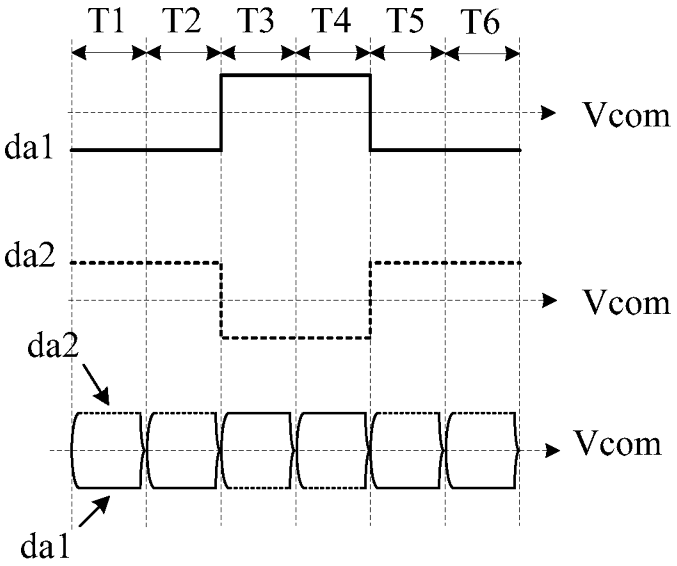
FIG. 11A is a timing diagram of other signals according to an embodiment of the present disclosure.

In an embodiment of the present disclosure, after data voltages corresponding to one row of sub-pixels are loaded to data lines, two adjacent data lines may be short-circuited to release charges. When data voltages on the two adjacent data lines are symmetrical, after the two data lines are short-circuited to release charges, voltages on the two data lines may be changed to a common electrode voltage Vcom. When a data voltage is loaded to the data line next time, the voltage on the data line may be changed from Vcom to the data voltage to be loaded, so that the data line may be uniformly charged. For example, as shown in FIG. 10 and FIG. 11A, in the period T1, when the data voltage Vr11 loaded on the data line DA1 is 0.6 V and the data voltage Vg11 loaded on the data line DA2 is 16 V, after the data voltages are loaded on the data line DA1 and the data line DA2, the data line DA1 and the data line DA2 are short-circuited to release charges, so that the voltages on the data line DA1 and the data line DA2 are the common electrode voltage Vcom of 8.3 V. In the period T2, when the data voltage Vr21 loaded on the data line DA1 is 0.6 V and the data voltage Vg21 loaded on the data line DA2 is 16 V, the voltage on the data line DA1 may be changed from Vcom to 0.6 V, and the voltage on the data line DA2 may be changed from Vcom to 16 V. After the data voltages are loaded on the data line DA1 and the data line DA2, the data line DA1 and the data line DA2 are short-circuited to release charges, so that the voltages on the data line DA1 and the data line DA2 are the common electrode voltage Vcom of 8.3 V. In the period T3, when the data voltage Vr31 loaded on the data line DA1 is 16 V and the data voltage Vg31 loaded on the data line DA2 is 0.6 V, the voltage on the data line DA1 may be changed from Vcom to 16 V, and the voltage on the data line DA2 may be changed from Vcom to 0.6 V. After the data voltages are loaded on the data line DA1 and the data line DA2, the data line DA1 and the data line DA2 are short-circuited to release charges, so that the voltages on the data line DA1 and the data line DA2 are the common electrode voltage Vcom of 8.3 V. In the period T4, when the data voltage Vr41 loaded on the data line DA1 is 16 V and the data voltage Vg41 loaded on the data line DA2 is 0.6 V, the voltage on the data line DA1 may be changed from Vcom to 16 V, and the voltage on the data line DA2 may be changed from Vcom to 0.6 V. After the data voltages are loaded on the data line DA1 and the data line DA2, the data line DA1 and the data line DA2 are short-circuited to release charges, so that the voltages on the data line DA1 and the data line DA2 are the common electrode voltage Vcom of 8.3 V. In the period T5, when the data voltage Vr51 loaded on the data line DA1 is 0.6 V and the data voltage Vg51 loaded on the data line DA2 is 16 V, the voltage on the data line DA1 may be changed from Vcom to 0.6 V, and the voltage on the data line DA2 may be changed from Vcom to 16 V. After the data voltages are loaded on the data line DA1 and the data line DA2, the data line DA1 and the data line DA2 are short-circuited to release charges, so that the voltages on the data line DA1 and the data line DA2 are the common electrode voltage Vcom of 8.3 V. In the period T6, when the data voltage Vr61 loaded on the data line DA1 is 0.6 V and the data voltage Vg61 loaded on the data line DA2 is 16 V, the voltage on the data line DA1 may be changed from Vcom to 0.6 V, and the voltage on the data line DA2 may be changed from Vcom to 16 V. After the data voltages are loaded on the data line DA1 and the data line DA2, the data line DA1 and the data line DA2 are short-circuited to release charges, so that the voltage on the data line DA1 and the data line DA2 are the common electrode voltage Vcom of 8.3 V.

Figure 11B:
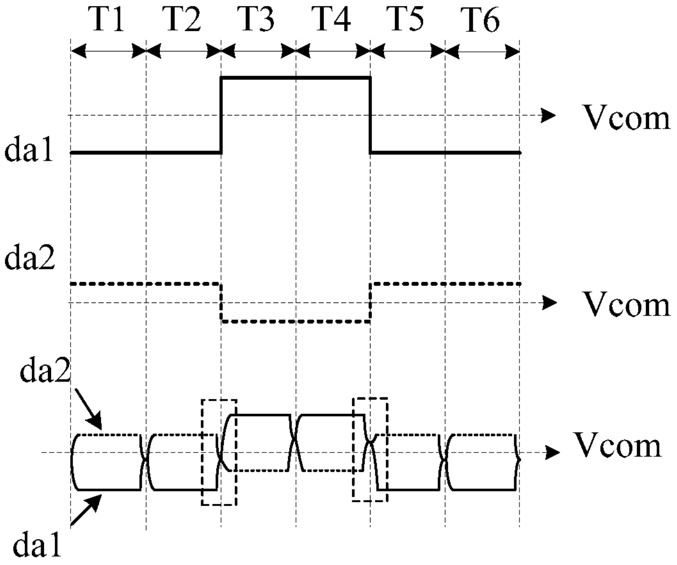
FIG. 11B is a timing diagram of other signals according to an embodiment of the present disclosure.

In an embodiment of the present disclosure, when data voltages loaded on the two adjacent data lines are asymmetric, after the two data lines are short-circuited to release charges, voltages on the two data lines may deviate from the common electrode voltage Vcom. When a data voltage is loaded to the data line next time, the voltage on the data line may be changed from a voltage deviating from Vcom to the data voltage to be loaded, so that the data lines may not be uniformly charged. For example, as shown in FIG. 10 and FIG. 11B, in the period T1, when the data voltage Vr11 loaded on the data line DA1 is 0.6 V and the data voltage Vg11 loaded on the data line DA2 is 12 V, after the data voltages are loaded on the data line DA1 and the data line DA2, the data line DA1 and the data line DA2 are short-circuited to release charges, so that the voltages on the data line DA1 and the data line DA2 are 6.3 V less than the common electrode voltage Vcom. In the period T2, when the data voltage Vr21 loaded on the data line DA1 is 0.6 V and the data voltage Vg21 loaded on the data line DA2 is 12 V, the voltage on the data line DA1 may be changed from 6.3 V less than Vcom to 0.6 V, and the voltage on the data line DA2 may be changed from 6.3 V less than Vcom to 12 V. After the data voltages are loaded on the data line DA1 and the data line DA2, the data line DA1 and the data line DA2 are short-circuited to release charges, so that the voltages on the data line DA1 and the data line DA2 are 6.3 V less than the common electrode voltage Vcom. In the period T3, when the data voltage Vr31 loaded on the data line DA1 is 16 V and the data voltage Vg31 loaded on the data line DA2 is 4.6 V, the voltage on the data line DA1 may be changed from 6.3 V less than Vcom to 16 V, and the voltage on the data line DA2 may be changed from 6.3 V less than Vcom to 4.6 V. After the data voltages are loaded on the data line DA1 and the data line DA2, the data line DA1 and the data line DA2 are short-circuited to release charges, so that the voltages on the data line DA1 and the data line DA2 are 10.3 V greater than the common electrode voltage Vcom. In the period T4, when the data voltage Vr31 loaded on the data line DA1 is 16 V and the data voltage Vg31 loaded on the data line DA2 is 4.6 V, the voltage on the data line DA1 may be changed from 10.3 V greater than Vcom to 16 V, and the voltage on the data line DA2 may be changed from 10.3 V greater than Vcom to 4.6 V. After the data voltages are loaded on the data line DA1 and the data line DA2, the data line DA1 and the data line DA2 are short-circuited to release charges, so that the voltages on the data line DA1 and the data line DA2 are 10.3 V greater than the common electrode voltage Vcom. In the period T5, when the data voltage Vr21 loaded on the data line DA1 is 0.6 V and the data voltage Vg21 loaded on the data line DA2 is 12 V, the voltage on the data line DA1 may be changed from 10.3 V greater than Vcom to 0.6 V, and the voltage on the data line DA2 may be changed from 10.3 V greater than Vcom to 12 V. After the data voltages are loaded on the data line DA1 and the data line DA2, the data line DA1 and the data line DA2 are short-circuited to release charges, so that the voltages on the data line DA1 and the data line DA2 are 6.3 V less than the common electrode voltage Vcom. In the period T6, when the data voltage Vr21 loaded on the data line DA1 is 0.6 V and the data voltage Vg21 loaded on the data line DA2 is 12 V, the voltage on the data line DA1 may be changed from 6.3 V less than Vcom to 0.6 V, and the voltage on the data line DA2 may be changed from 6.3 V less than Vcom to 12 V. In this way, a voltage of a reference point from which the data line DA1 and the data line DA2 are charged is sometimes larger than Vcom and sometimes less than Vcom, causing a problem that the data lines are not uniformly charged.

Figure 12:
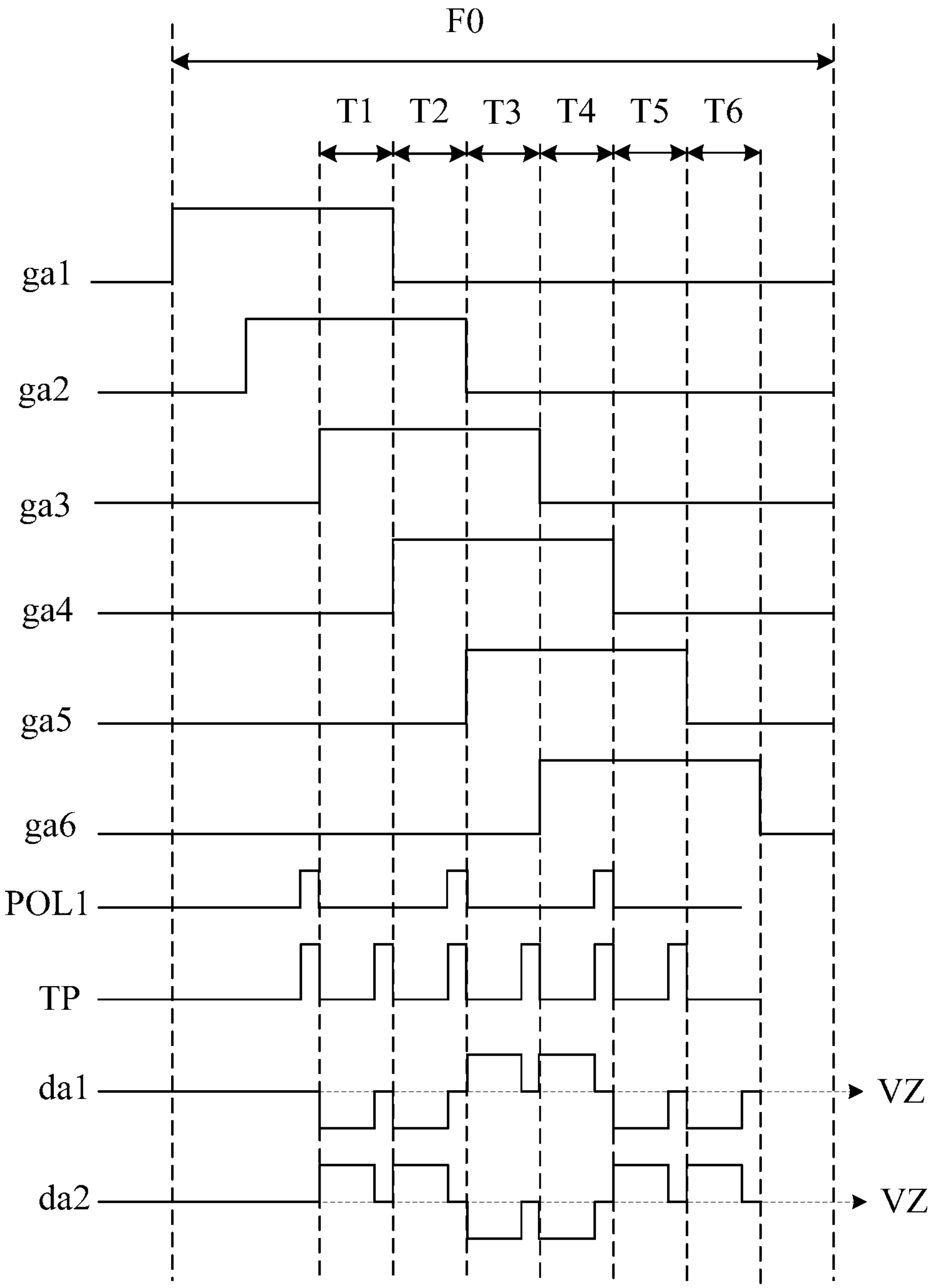
FIG. 12 is a timing diagram of other signals according to an embodiment of the present disclosure.

To solve this problem, the driving method according to an embodiment of the present disclosure may further include: inputting a reference voltage before inputting the data voltage to the data line. Therefore, charges on the data lines may be released without short-circuiting the adjacent data lines. In addition, each data voltage loaded on the data line may be charged from a reference point of the reference voltage, so as to improve the charging uniformity. For example, as shown in FIG. 12, before the period T1, a reference voltage VG is input to the data line DA1, and the reference voltage VG is input to the data line DA2. In the period T1, the data voltage Vr11 is loaded on the data line DA1 and the data voltage Vg11 is loaded on the data line DA2. Before the period T2, the reference voltage VG is input to the data line DA1, and the reference voltage VG is input to the data line DA2. In the period T2, the data voltage Vr21 is loaded on the data line DA1, and the data voltage Vg21 is loaded on the data line DA2. Before the period T3, the reference voltage VG is input to the data line DA1, and the reference voltage VG is input to the data line DA2. In the period T3, the data voltage Vr31 is loaded on the data line DA1 and the data voltage Vg31 is loaded on the data line DA2. Other periods are similar and will not be repeated herein.

According to an embodiment of the present disclosure, the reference voltage is a voltage between a first power supply voltage and a second power supply voltage. In this way, each data voltage loaded on the data line is charged from the reference point of the reference voltage, so as to improve the charging uniformity.

In an embodiment of the present disclosure, the reference voltage is a midpoint voltage HAVDD between the first power supply voltage and the second power supply voltage. Since the midpoint voltage HAVDD may be equal to Vcom, the midpoint voltage HAVDD may differ from Vcom by a small amount. In this way, data voltages are all charged from the midpoint voltage HAVDD, further improving the charging uniformity.

Figure 13:
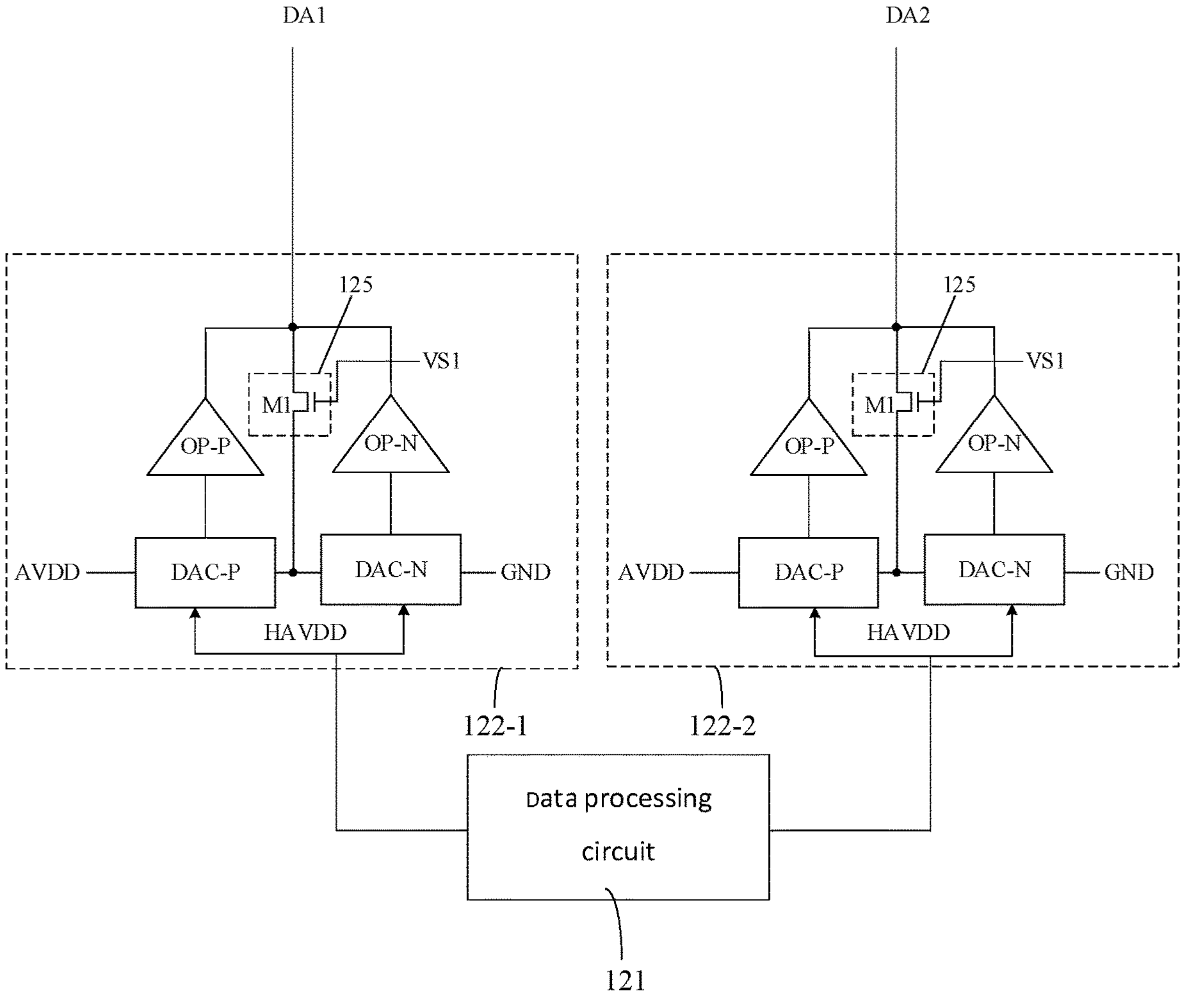
FIG. 13 is a schematic diagram of other structures of a source driving circuit according to an embodiment of the present disclosure.

In an embodiment of the present disclosure, as shown in FIG. 13, the source driving circuit may further include a first charge sharing circuit 125. The first charge sharing circuit 125 is configured to receive a first reference control signal VS1, and input a reference voltage before inputting each of the data voltages to a data line electrically connected with the first charge sharing circuit 125, under control of the first reference control signal VS1. Illustratively, the first charge sharing circuit 125 may include a first switching transistor M1. A gate of the first switching transistor M1 is configured to receive the first reference control signal VS1, a first electrode of the first switching transistor M1 is configured to receive the reference voltage, and a second electrode of the first switching transistor M1 is electrically connected with the data line. It should be noted that the first switch transistor M1 may be an N-type transistor or a P-type transistor. The first electrode may be a source and the second electrode may be a drain; or, the first electrode may be a drain and the second electrode may be a source.

In an embodiment of the present disclosure, the reference voltage is input to a corresponding data line when being triggered by a rising edge of the first reference control signal VS1. In addition, the data voltage is input to the corresponding data line when being triggered by a falling edge of the first reference control signal VS1. For example, the first reference control signal VS1 may be the data loading signal TP. As shown in FIG. 12 and FIG. 13, before the period T1, the first switching transistor M1 is turned on when being triggered by the rising edge of the data loading signal TP, and the reference voltage VG is input to the data line DAL. In the period T1, the first switching transistor M1 is turned off when being triggered by the falling edge of the data loading signal TP, and the data voltage Vr11 is loaded on the data line DAL. Before the period T2, the first switching transistor M1 is turned on when being triggered by the rising edge of the data loading signal TP, and the reference voltage VG is input to the data line DAL. In the period T2, the first switching transistor M1 is turned off when being triggered by the falling edge of the data loading signal TP, and the data voltage Vr21 is loaded on the data line DAL. Before the period T3, the first switching transistor M1 is turned on when being triggered by the rising edge of the data loading signal TP, and the reference voltage VG is input to the data line DAL. In the period T3, the first switching transistor M1 is turned off when being triggered by the falling edge of the data loading signal TP, and the data voltage Vr31 is loaded on the data line DAL. Other periods are similar and will not be repeated herein.

In an embodiment of the present disclosure, the reference voltage is input to the corresponding data line when being triggered by a falling edge of the first reference control signal VS1. The data voltage is input to the corresponding data line when being triggered by a rising edge of the first reference control signal VS1. This implementation manner is substantially the same as that described above and will not be described in detail herein.

The present disclosure provides an embodiment of another driving method for a display panel, which is a variation of an implementation manner in embodiments described above. Only differences between this embodiment and above embodiments will be described below, and similarities will not be repeated herein.

Figure 14:
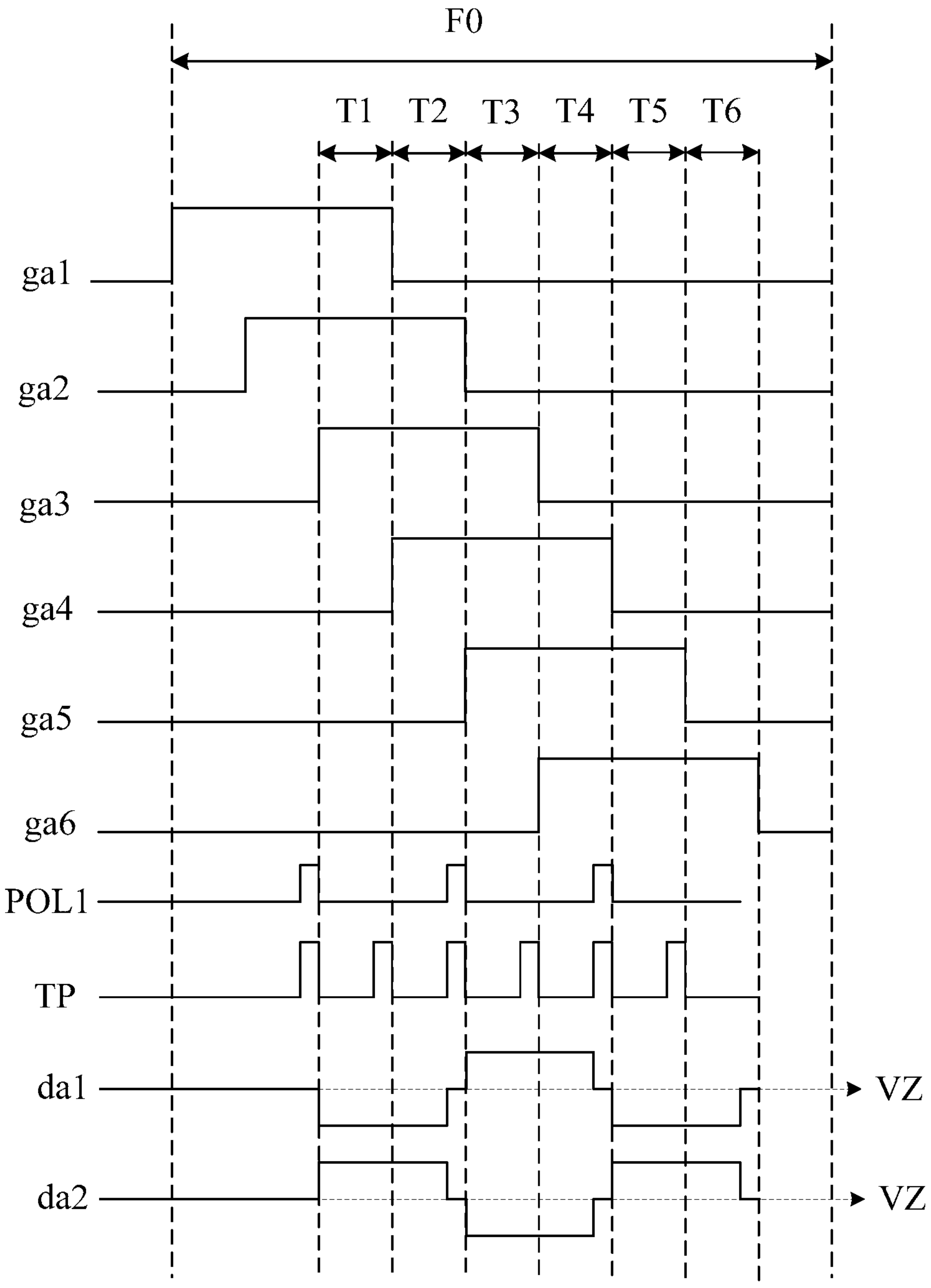
FIG. 14 is a timing diagram of other signals according to an embodiment of the present disclosure.

In an embodiment of the present disclosure, a reference voltage is input before a first data voltage of a voltage group is input to a data line. Therefore, charges on the data lines may be released without short-circuiting adjacent data lines. In addition, each voltage group loaded on the data line may be charged from a reference point of the reference voltage, so as to improve the charging uniformity. For example, as shown in FIG. 14, before the period T1, a reference voltage VG is input to the data line DA1, and the reference voltage VG is input to the data line DA2. In the period T1, the data voltage Vr11 is loaded on the data line DA1, and the data voltage Vg11 is loaded on the data line DA2. In the period T2, the data voltage Vr21 is loaded on the data line DAL, and the data voltage Vg21 is loaded on the data line DA2. Before the period T3, the reference voltage VG is input to the data line DA1, and the reference voltage VG is input to the data line DA2. In the period T3, the data voltage Vr31 is loaded on the data line DAL, and the data voltage Vg31 is loaded on the data line DA2. Other periods are similar and will not be repeated herein.

Illustratively, the voltage group including two adjacent data voltages is taken as an example. For the data line DA1, the data voltage VR11-1 is a first data voltage in a voltage group consisting of the data voltage VR11-1 and the data voltage VR21-1. The data voltage VR31-1 is a first data voltage in a voltage group consisting of the data voltage VR31-1 and the data voltage VR41-1. The data voltage VR51-1 is a first data voltage in a voltage group consisting of the data voltage VR51-1 and the data voltage VR61-1. For the data line DA2, the data voltage VG11-1 is a first data voltage in a voltage group consisting of the data voltage VG11-1 and the data voltage VG21-1. The data voltage VG31-1 is a first data voltage in a voltage group consisting of the data voltage VG31-1 and the data voltage VG41-1. The data voltage VG51-1 is a first data voltage in a voltage group consisting of the data voltage VG51-1 and the data voltage VG61-1.

Illustratively, the voltage group including three adjacent data voltages is taken as an example. For the data line DA1, the data voltage VR11-1 is a first data voltage in a voltage group consisting of the data voltage VR11-1, the data voltage VR21-1, and the data voltage VR31-1. The data voltage VR41-1 is a first data voltage in a voltage group consisting of the data voltage VR41-1, the data voltage VR51-1, and the data voltage VR 61-1. For the data line DA2, the data voltage VG11-1 is a first data voltage in a voltage group consisting of the data voltage VG11-1, the data voltage VG21-1, and the data voltage VG31-1. The data voltage VG41-1 is a first data voltage in a voltage group consisting of the data voltage VG41-1, the data voltage VG51-1, and the data voltage VG61-1.

Figure 15:
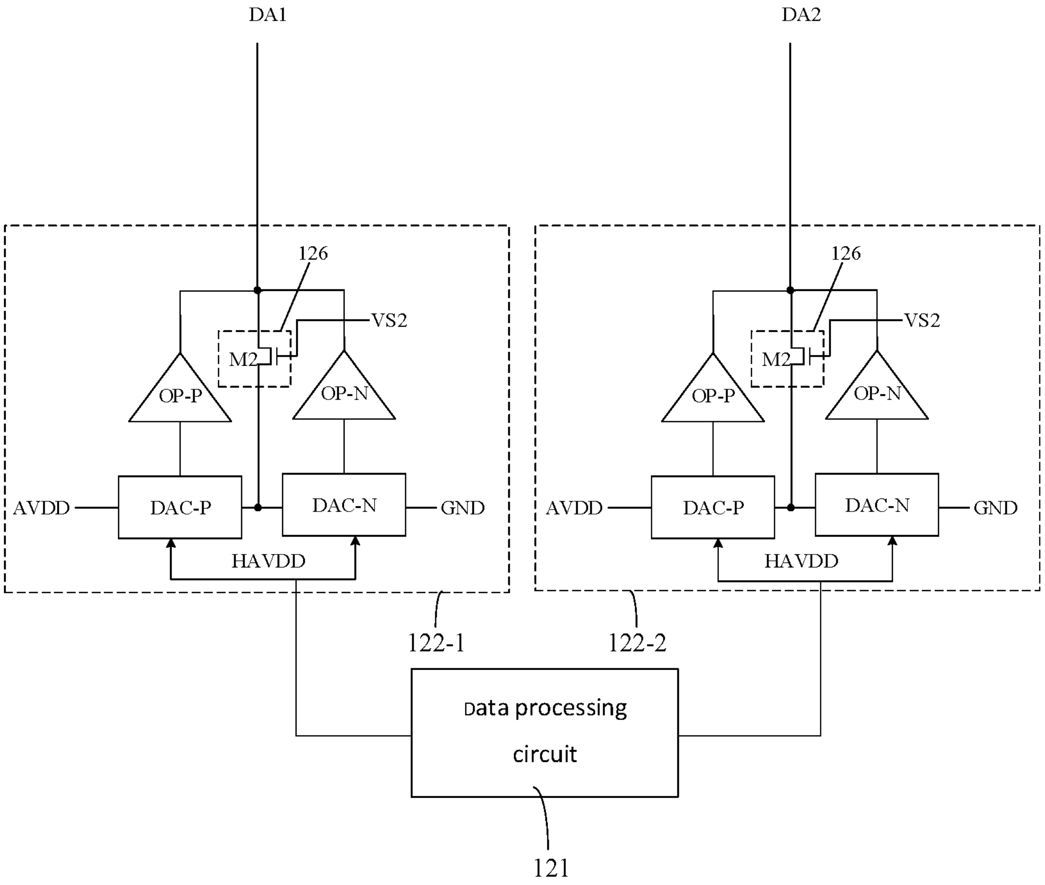
FIG. 15 is a schematic diagram of other structures of a source driving circuit according to an embodiment of the present disclosure.

In an embodiment of the present disclosure, as shown in FIG. 15, the source driving circuit further includes a second charge sharing circuit 126. The second charge sharing circuit 126 is configured to receive a second reference control signal VS2, and input a reference voltage before inputting a first data voltage of each of the voltage groups to each of the data lines, under control of the second reference control signal VS2. Illustratively, the second charge sharing circuit 126 includes a second switching transistor M2. A gate of the second switching transistor M2 is configured to receive the second reference control signal VS2, a first electrode of the second switching transistor M2 is configured to receive the reference voltage, and a second electrode of the second switching transistor M2 is electrically connected with the data line. It should be noted that for the second switch transistor M2, the first electrode may be a source and the second electrode may be a drain, or, the first electrode may be a drain and the second electrode may be a source.

In an embodiment of the present disclosure, the reference voltage is input to a corresponding data line when being triggered by a rising edge of the second reference control signal VS2. The data voltage is input to the corresponding data line when being triggered by a falling edge of the data loading signal TP. For example, the second reference control signal VS2 may be the polarity reversal signal POLL. As shown in FIG. 14 and FIG. 15, before the period T1, the second switch transistor M2 is turned on when being triggered by the rising edge of the polarity reversal signal POL1, and the reference voltage VG is input to the data line DAL. In the period T1, the second switch transistor M2 is turned off when being triggered by the falling edge of the polarity reversal signal POL1, and the data voltage Vr11 is loaded on the data line DA1 when being triggered by the falling edge of the data loading signal TP. In the period T2, the data voltage Vr21 is loaded on the data line DA1 when being triggered by the falling edge of the data loading signal TP. Before the period T3, the second switch transistor M2 is turned on when being triggered by the rising edge of the polarity reversal signal POL1, and the reference voltage VG is input to the data line DAL. In the period T3, the second switch transistor M2 is turned off when being triggered by the falling edge of the polarity reversal signal POL1, and the data voltage Vr31 is loaded on the data line DA1 when being triggered by the falling edge of the data loading signal TP. Other periods are similar and will not be repeated herein.

The present disclosure provides an embodiment of another driving method for a display panel, which is a variation of an implementation manner in embodiments described above. Only differences between this embodiment and above embodiments will be described below, and similarities will not be repeated herein.

As shown in FIG. 10, taking the data line DA1 as an example, during the period T1, the voltage Vr11 with a negative polarity is loaded on the data line DAL. In the period T2, the voltage Vr21 with a negative polarity is loaded on the data line DAL. In the period T3, the voltage Vr31 with a positive polarity is loaded on the data line DAL. In the period T4, the voltage Vr41 with a positive polarity is loaded on the data line DAL. In the period T5, the voltage Vr51 with a negative polarity is loaded on the data line DAL. In the period T6, the voltage Vr61 with a negative polarity is loaded on the data line DAL. The red sub-pixel R31 is pre-charged with the voltage Vr21 and then needs to be charged with the voltage Vr31. When the voltage of the red sub-pixel R31 is switched from Vr21 to Vr31, although the red sub-pixel R31 is pre-charged with the voltage Vr21, the voltage Vr21 with a negative polarity is switched to the voltage Vr31 with a positive polarity, and thus the voltage changes too much from low to high, resulting in difficulty in charging the voltage Vr31 for the red sub-pixel R31. The red sub-pixel R41 is pre-charged with the voltage Vr31 and then needs to be charged with the voltage Vr41. When the voltage of the red sub-pixel R41 is switched from Vr31 to Vr41, although the red sub-pixel R41 is pre-charged with the voltage Vr31, the voltage Vr31 with a positive polarity is switched to the voltage Vr41 with a positive polarity, and thus the voltage does not change much, so that it may be easier to charge the voltage Vr41 for the red sub-pixel R41. The red sub-pixel R51 is pre-charged with the voltage Vr41 and then needs to be charged with the voltage Vr51. When the voltage of the red sub-pixel R51 is switched from Vr41 to Vr51, although the red sub-pixel R51 is pre-charged with the voltage Vr41, the voltage Vr41 with a positive polarity is switched to the voltage Vr51 with a negative polarity, and thus the voltage changes too much from high to low, resulting in difficulty in charging the voltage Vr51 for the red sub-pixel R51. The red sub-pixel R61 is pre-charged with the voltage Vr51 and then needs to be charged with the voltage Vr61. When the voltage of the red sub-pixel R61 is switched from Vr51 to Vr61, although the red sub-pixel R61 is pre-charged with the voltage Vr51, the voltage Vr51 with a negative polarity is switched to the voltage Vr61 with a negative polarity, and thus the voltage does not change much, so that it may be easier to charge the voltage Vr61 for the red sub-pixel R61. In this way, a charging rate of the red sub-pixel R31 is less than a charging rate of the red sub-pixel R41, and a charging rate of the red sub-pixel R51 is less than a charging rate of the red sub-pixel R61, resulting in non-uniform charging rates of sub-pixels.

In order to improve the uniformity of the charging rates of the sub-pixels, in an embodiment of the present disclosure, the driving method may further include: superimposing a compensation voltage on the data line when inputting a first data voltage of a voltage group to the data line. When the first data voltage corresponds to a positive polarity, a voltage value obtained by superimposing the compensation voltage on the first data voltage is greater than the first data voltage. When the first data voltage corresponds to a negative polarity, a voltage value obtained by superimposing the compensation voltage on the first data voltage is less than the first data voltage. In this way, the uniformity of the charging rates of the sub-pixels may be improved by overdriving.

In an embodiment of the present disclosure, in different voltage groups, compensation voltages superimposed on first data voltages corresponding to the same polarity are the same. For example, in different voltage groups, compensation voltages superimposed on first data voltages corresponding to a positive polarity are the same. In different voltage groups, compensation voltages superimposed on first data voltages corresponding to a negative polarity are the same. Further, absolute values of compensation voltages corresponding to each of the voltage groups are the same.

Figure 16:
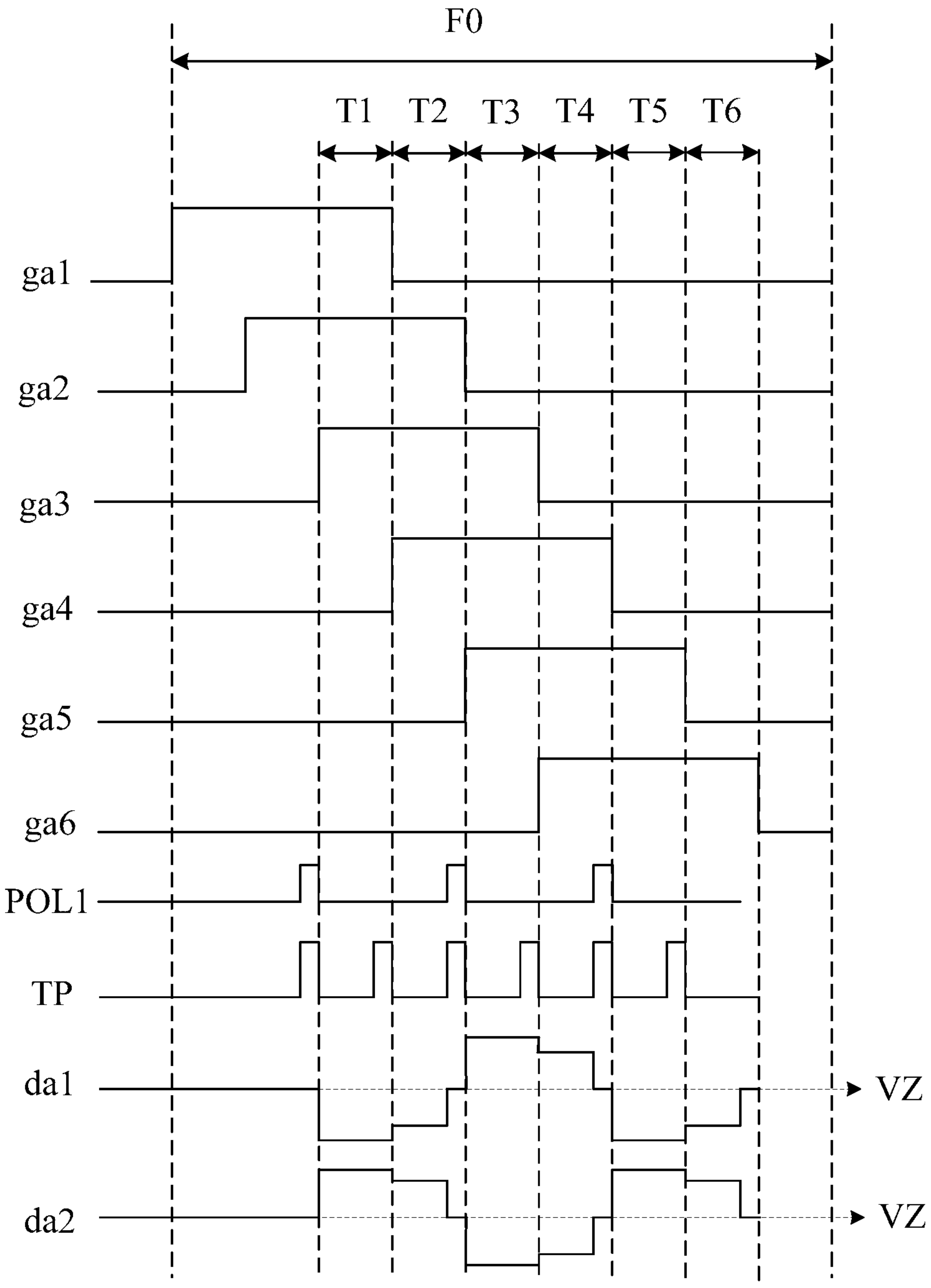
FIG. 16 is a timing diagram of other signals according to an embodiment of the present disclosure.

For example, as shown in FIG. 16, before the period T1, a reference voltage VG is input to the data line DA1, and the reference voltage VG is input to the data line DA2. In the period T1, the data voltage Vr11 and a compensation voltage VC1 are loaded on the data line DA1, and the data voltage Vg11 and a compensation voltage VC2 are loaded on the data line DA2. In the period T2, the data voltage Vr21 is loaded on the data line DA1, and the data voltage Vg21 is loaded on the data line DA2. Before the period T3, the reference voltage VG is input to the data line DA1, and the reference voltage VG is input to the data line DA2. In the period T3, the data voltage Vr31 and the compensation voltage VC2 are loaded on the data line DA1, and the data voltage Vg31 and the compensation voltage VC1 are loaded on the data line DA2. In addition, $Vr11+VC1<Vr11$, $Vg11+VC2>Vg11$, $Vr31+VC2>Vr31$, $Vg31+VC1<Vg31$, and $|VC1|=|VC2|$. Other periods are similar and will not be repeated herein.

The present disclosure provides an embodiment of another driving method for a display panel, which is a variation of an implementation manner in embodiments described above. Only differences between this embodiment and above embodiments will be described below, and similarities will not be repeated herein.

Figure 17:
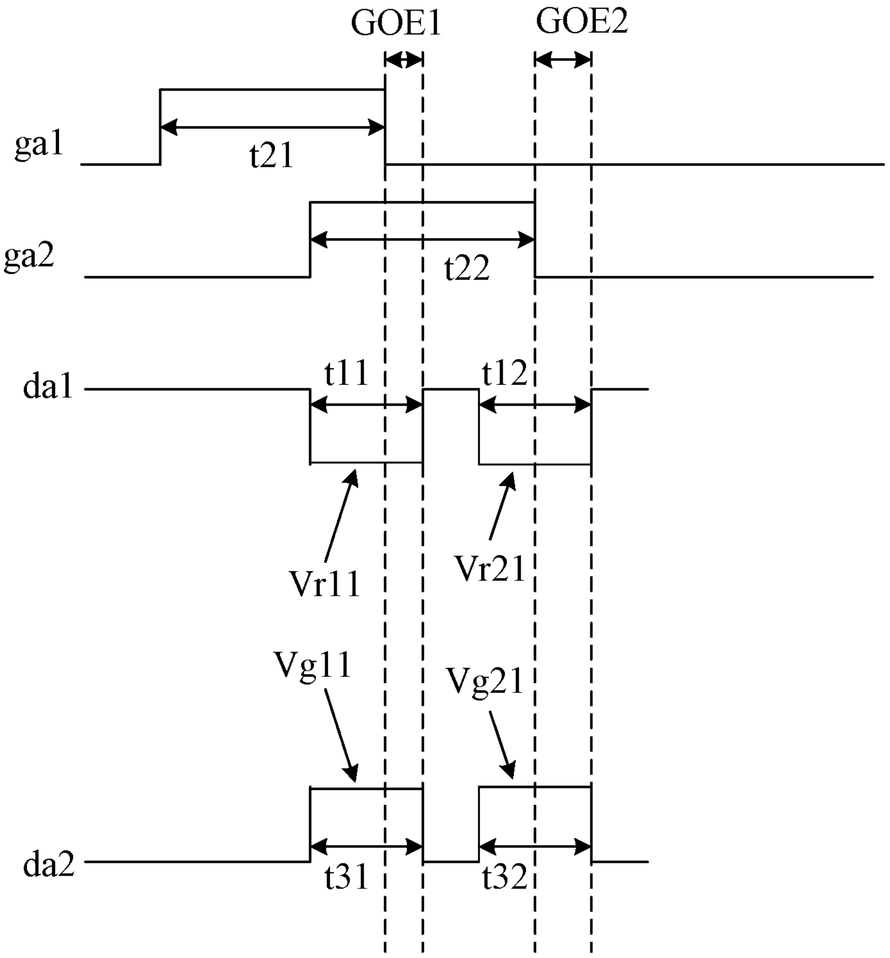
FIG. 17 is a timing diagram of other signals according to an embodiment of the present disclosure.

In order to improve the uniformity of the charging rates of the sub-pixels, in an embodiment of the present disclosure, as shown in FIG. 17, a maintenance duration of the data voltage loaded on the data line and a maintenance duration of opening of the sub-pixel corresponding to the data voltage have an overlapping duration. The overlapping duration is a charging duration of the sub-pixel. The maintenance duration of the data voltage loaded on the data line and the maintenance duration of opening of the sub-pixel corresponding to the data voltage have a non-overlapping duration. If the non-overlapping duration becomes longer, the overlapping duration is shorter, that is, the charging duration of the sub-pixel is shorter, and the charging rate of the sub-pixel is reduced. If the non-overlapping duration becomes shorter, the overlapping duration is increased, that is, the charging duration of the sub-pixel is increased, and the charging rate of the sub-pixel is increased. During specific implementation, in the same voltage group, a first data voltage loaded on the data line may have a first non-overlapping duration and the remaining of the data voltages loaded on the data line have a second non-overlapping duration. By making the first non-overlapping duration less than the second non-overlapping duration, the charging rates of the sub-pixels corresponding to the first data voltages may be increased, and the charging rates of the sub-pixels corresponding to the other data voltages may be decreased, so that charging rates of different sub-pixels are close to each other as much as possible, or even the same, improving the uniformity of the charging rates of the sub-pixels.

For example, first non-overlapping durations corresponding to voltage groups may be the same, and second non-overlapping durations corresponding to the voltage groups are the same. As shown in FIG. 17, when the voltages Vr11 and Vr21 are taken as a voltage group, the voltage Vr11 is taken as the first data voltage in the voltage group, and Vr21 is taken as the remaining data voltage in the voltage group. The maintenance duration t11 of the voltage Vr11 loaded on the data line DA1 and the maintenance duration t21 of a gate-on signal corresponding to the red sub-pixel R11 have a first non-overlapping duration GOE1. The maintenance duration t12 of the voltage Vr21 loaded on the data line DA1 and the maintenance duration t22 of a gate-on signal corresponding to the red sub-pixel R21 have a second non-overlapping duration GOE2. Herein, $GOE1<GOE2$, t11=t12, and t21=t22. When the voltages Vg11 and Vg21 are taken as a voltage group, the voltage Vg11 is taken as the first data voltage in the voltage group, and the voltage Vg21 is taken as the remaining data voltage in the voltage group. The maintenance duration t31 of the voltage Vg11 loaded on the data line DA2 and the maintenance duration t21 of a gate-on signal corresponding to the green sub-pixel G11 have a first non-overlapping duration GOE1. The maintenance duration t32 of the voltage Vg21 loaded on the data line DA2 and the maintenance duration t22 of a gate-on signal corresponding to the green sub-pixel G21 have a second non-overlapping duration GOE2. Herein, $GOE1<GOE2$, and t31=t32.

In an embodiment of the present disclosure, the first non-overlapping duration of the first data voltage corresponding to a positive polarity may be less than the first non-overlapping duration of the first data voltage corresponding to a negative polarity. In a specific application, switching from a data voltage with a positive polarity to a data voltage with a negative polarity is equivalent to discharging, which is faster than switching from a data voltage with a negative polarity to a data voltage with a positive polarity. Therefore, by making the first non-overlapping duration of the first data voltage corresponding to the positive polarity less than the first non-overlapping duration of the first data voltage corresponding to the negative polarity, the charging rate for the data voltage corresponding to the positive polarity may be greater than the charging rate for the data voltage corresponding to the negative polarity, thereby further making the brightness uniform.

Figure 18:
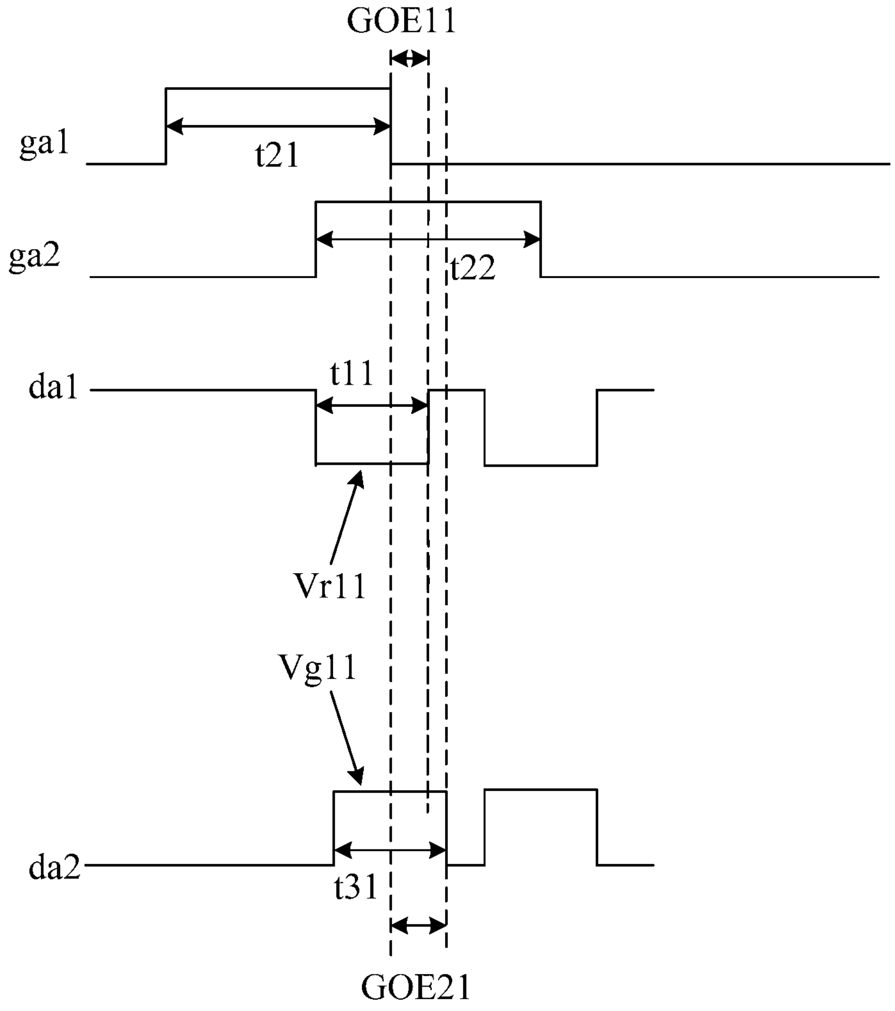
FIG. 18 is a timing diagram of other signals according to an embodiment of the present disclosure.

For example, as shown in FIG. 18, when the voltages Vr11 and Vr21 are taken as a voltage group, the voltage Vr11 is taken as the first data voltage in the voltage group and the voltage Vr21 is taken as the remaining data voltage in the voltage group. The maintenance duration t11 of the voltage Vr11 loaded on the data line DA1 and the maintenance duration t21 of the gate-on signal corresponding to the red sub-pixel R11 have a first non-overlapping duration GOE11. When the voltages Vg11 and Vg21 are taken as a voltage group, the voltage Vg11 is taken as the first data voltage in the voltage group, and the voltage Vg21 is taken as the remaining data voltage in the voltage group. The maintenance duration t31 of the voltage Vg11 loaded on the data line DA2 and the maintenance duration t21 of the gate-on signal corresponding to the green sub-pixel G11 have a second non-overlapping duration GOE21. Herein, GOE11<GOE21, t11=t31, and t21=t22. In this way, the charging rate of the data voltage corresponding to the positive polarity may be greater than the charging rate of the data voltage corresponding to the negative polarity, thereby further making the brightness uniform.

Obviously, those skilled in the art can make various modifications and variations to embodiments of the present disclosure without departing from the spirit and scope of embodiments of the present disclosure. In this way, if these modifications and variations of embodiments of the present disclosure fall within the scope of the claims of the present disclosure and their equivalent technologies, the present disclosure also intends to include these modifications and variations.

What is claimed is:

1. A driving method for a display panel, comprising:

obtaining display data of a current display frame; and inputting data voltages to a data line according to the display data, so that a corresponding data voltage is charged into a sub-pixel electrically connected with the data line; wherein the data voltages input on the data line are divided into a plurality of voltage groups, each of the plurality of voltage groups comprises at least two adjacent data voltages, and polarities corresponding to data voltages in a same voltage group are same; polarities corresponding to data voltages in two adjacent voltage groups input to a same data line are different; and polarities of corresponding voltage groups on two adjacent data lines are different;

wherein the driving method further comprises: inputting a reference voltage before inputting the data voltage to the data line, under control of a first reference control signal;

wherein the reference voltage is input to a corresponding data line when being triggered by a first set edge of the first reference control signal; and the data voltage is input to the corresponding data line when being triggered by a second set edge of the first reference control signal;

wherein the first set edge is a rising edge, and the second set edge is a falling edge; or, the first set edge is a falling edge, and the second set edge is a rising edge.

2. The driving method according to claim 1, further comprising:

inputting the reference voltage before inputting a first data voltage of the voltage group to the data line.

3. The driving method according to claim 2, wherein the data voltage is formed by dividing a first power supply voltage and a second power supply voltage; wherein the first power supply voltage is less than the second power supply voltage; and the reference voltage is a voltage between the first power supply voltage and the second power supply voltage.

4. The driving method according to claim 1, wherein the data voltage is formed by dividing a first power supply voltage and a second power supply voltage; wherein the first power supply voltage is less than the second power supply voltage; and the reference voltage is a voltage between the first power supply voltage and the second power supply voltage.

5. The driving method according to claim 4, wherein the reference voltage is a midpoint voltage HAVDD between the first power supply voltage and the second power supply voltage.

6. The driving method according to claim 1, further comprising:

superimposing a compensation voltage on the data line when inputting a first data voltage of the voltage group to the data line;' wherein when the first data voltage corresponds to a positive polarity, a voltage value obtained by superimposing the compensation voltage on the first data voltage is greater than the first data voltage; and when the first data voltage corresponds to a negative polarity, a voltage value obtained by superimposing the compensation voltage on the first data voltage is less than the first data voltage.

7. The driving method according to claim 6, wherein in different voltage groups, compensation voltages superimposed on first data voltages corresponding to a same polarity are same;

wherein absolute values of compensation voltages corresponding to each voltage group are same.

8. The driving method according to claim 1, wherein a maintenance duration of the data voltage loaded on the data line and a maintenance duration of opening of the sub-pixel corresponding to the data voltage have a non-overlapping duration; and in the same voltage group, a first data voltage loaded on the data line has a first non-overlapping duration, and a remaining data voltage loaded on the data line have a second non-overlapping duration; wherein the first non-overlapping duration is less than the second non-overlapping duration.

9. The driving method according to claim 8, wherein the first non-overlapping duration of the first data voltage corresponding to a positive polarity is less than the first non-overlapping duration of the first data voltage corresponding to a negative polarity.

10. A display device, comprising:

a timing controller, configured to obtain and output display data of a current display frame; and generate and output a polarity reversal signal based on a rule that: data voltages input on a data line are divided into a plurality of voltage groups, each of the plurality of voltage groups comprises at least two adjacent data voltages, polarities corresponding to data voltages in a same voltage group are same, polarities corresponding to data voltages in two adjacent voltage groups input to a same data line are different, and polarities of corresponding voltage groups on two adjacent data lines are different; and a display panel, comprising a source driving circuit; wherein the source driving circuit is configured to receive the display data and the polarity reversal signal; and input data voltages to a data line according to the display data and the polarity reversal signal, so that a corresponding data voltage is charged into a sub-pixel electrically connected with the data line;

wherein the source driving circuit further comprises: a first charge sharing circuit;

wherein the first charge sharing circuit is configured to receive a first reference control signal, and input a reference voltage before inputting each of the plurality of data voltages to a data line electrically connected with the first charge sharing circuit, under control of the first reference control signal;

wherein the reference voltage is input to a corresponding data line when being triggered by a first set edge of the first reference control signal; and the data voltage is input to the corresponding data line when being triggered by a second set edge of the first reference control signal;

wherein the first set edge is a rising edge, and the second set edge is a falling edge; or, the first set edge is a falling edge, and the second set edge is a rising edge.

11. The display device according to claim 10, wherein the source driving circuit comprises: a data processing circuit and a plurality of voltage output circuits;

wherein each of the data lines is electrically connected with one of the plurality of voltage output circuits one by one;

the data processing circuit is configured to receive the display data, and output corresponding display data to each of the plurality of voltage output circuits according to the display data; and the voltage output circuit is configured to receive the polarity reversal signal and the display data output by the data processing circuit, and input the data voltages to the data line electrically connected with the voltage output circuit according to the polarity reversal signal and the display data output by the data processing circuit, so that the corresponding data voltage is charged into the sub-pixel electrically connected with the data line.

12. The display device according to claim 11, wherein the source driving circuit further comprises: a second charge sharing circuit;

wherein the second charge sharing circuit is configured to receive a second reference control signal, and input the reference voltage before inputting a first data voltage of each of the plurality of voltage groups to each of the data lines, under control of the second reference control signal.

13. The display device according to claim 12, wherein the second reference control signal is the polarity reversal signal;

wherein the second charge sharing circuit comprises a second switching transistor;

wherein a gate of the second switching transistor is configured to receive the second reference control signal, a first electrode of the second switching transistor is configured to receive the reference voltage, and a second electrode of the second switching transistor is electrically connected with the data line.

14. The display device according to claim 11, wherein the voltage output circuit comprises a first output circuit and a second output circuit; wherein each of the data lines is electrically connected with the first output circuit and the second output circuit one by one;

the first output circuit is configured to input a data voltage corresponding to a positive polarity to the data line electrically connected with the first output circuit according to the polarity reversal signal and the display data; and the second output circuit is configured to input a data voltage corresponding to a negative polarity to the data line electrically connected with the second output circuit according to the polarity reversal signal and the display data.

15. The display device according to claim 14, wherein the first output circuit comprises a first digital-to-analog conversion circuit and a first amplifier; wherein a midpoint voltage terminal is provided between a first power supply voltage and a second power supply voltage, and the first digital-to-analog conversion circuit is electrically connected between the second power supply voltage and the midpoint voltage terminal;

the first digital-to-analog conversion circuit is configured to receive the polarity reversal signal and the display data, and perform digital-to-analog conversion on the display data according to the polarity reversal signal to generate and output a data voltage corresponding to a positive polarity; and the first amplifier is configured to receive the data voltage output by the first digital-to-analog conversion circuit, amplify the data voltage received and input the data voltage after being amplified to the data line electrically connected with the first amplifier.

16. The display device according to claim 15, wherein the second output circuit comprises a second digital-to-analog conversion circuit and a second amplifier; wherein the midpoint voltage terminal is provided between the first power supply voltage and the second power supply voltage, and the second digital-to-analog conversion circuit is electrically connected between the first power supply voltage and the midpoint voltage terminal;

the second digital-to-analog conversion circuit is configured to receive the polarity reversal signal and the display data, and perform digital-to-analog conversion on the display data according to the polarity reversal signal to generate and output a data voltage corresponding to a negative polarity; and the second amplifier is configured to receive the data voltage output by the second digital-to-analog conversion circuit, amplify the data voltage received and input the data voltage after being amplified to the data line electrically connected with the second amplifier.

17. The display device according to claim 10, wherein the first charge sharing circuit comprises a first switching transistor;

a gate of the first switching transistor is configured to receive the first reference control signal, a first electrode of the first switching transistor is configured to receive the reference voltage, and a second electrode of the first switching transistor is electrically connected with the data line.

* * * * *